(12) United States Patent
Hennedy

(10) Patent No.: US 8,520,787 B2
(45) Date of Patent: Aug. 27, 2013

(54) APPARATUS AND METHOD FOR DESKEWING SERIAL DATA TRANSMISSIONS

(75) Inventor: Michael Hennedy, Holmdel, NJ (US)

(73) Assignee: Analog Devices, Inc., Norwood, MA (US)

( * ) Notice: Subject to any disclaimer, the term of this patent is extended or adjusted under 35 U.S.C. 154(b) by 258 days.

(21) Appl. No.: 13/044,432

(22) Filed: Mar. 9, 2011

(65) Prior Publication Data

US 2012/0230455 A1    Sep. 13, 2012

(51) Int. Cl.
*H04L 7/00* (2006.01)
(52) U.S. Cl.
USPC ........... 375/354; 375/220; 375/224; 375/226; 375/316; 375/355; 375/365; 375/366; 375/368; 375/371; 370/503; 370/508; 370/509; 370/510; 370/511; 370/512; 370/513; 370/514; 370/516; 455/502; 455/516; 327/141; 327/163; 714/707
(58) Field of Classification Search
USPC ................. 375/220, 224, 226, 316, 354, 355, 375/365, 366, 368, 371; 370/503, 508, 509, 370/510, 511, 512, 513, 514, 516; 455/502, 455/516; 327/141, 163; 714/707
See application file for complete search history.

(56) References Cited

U.S. PATENT DOCUMENTS

| | | | |
|---|---|---|---|
| 2003/0131301 A1* | 7/2003 | Shimono et al. | 714/752 |
| 2010/0008460 A1* | 1/2010 | Zhang et al. | 375/376 |
| 2012/0230373 A1 | 9/2012 | Hennedy | |

OTHER PUBLICATIONS

International Search Report for International Application No. PCT/US2012/028078, mailed May 21, 2012, in 4 pages.
Written Opinion of the International Searching Authority for International application No. PCT/US2012/028078, mailed May 21, 2012, in 10 pages.
Defossez, Marc: "Virtex-5 FPGA Interface to a JESD204A Compliant ADC", XILINX Application Note XAPP876 (V1.0.1), URL:http://www.xilinx.com/support/documentation/application_notes/xapp876.pdf [retrieved on Apr. 4, 2012], Feb. 22, 2010, pp. 1-26.
Lattice Semiconductor Corporation: "JESD204A IP Core User's Guide", Dec. 2010, pp. 1-28, XP002675294, Retrieved from the Internet: URL:http://www.latticesemi.com/documents/ipug91.pdf [retrieved on May 4, 2012] p. 5-p. 9 figures 2-2, 2-4, 2-4.
International Search Report for International Application No. PCT/US2012/028100, mailed May 21, 2012, in 4 pages.
Written Opinion of the International Searching Authority for International application No. PCT/US2012/028100, mailed May 21, 2012, in 10 pages.

* cited by examiner

*Primary Examiner* — Leon Flores
(74) *Attorney, Agent, or Firm* — Knobbe, Martens, Olson & Bear LLP

(57) ABSTRACT

Apparatus and methods are disclosed, such as those involving deskewing serial data transmissions. One such apparatus includes a plurality of receivers, each of which is configured to receive a serial data stream. Each of the receivers includes a shift register including a plurality of stages arranged in sequence to propagate a stream of characters. Each of the stages is configured to store a character, and shift the character to a next stage in response to a clock signal. The receiver also includes a multiplexer having a plurality of inputs, each of the inputs being electrically coupled to a respective one of the stages of the shift register, and to select one of the stages to generate an output such that the outputs of the multiplexers in the receivers are deskewed.

20 Claims, 19 Drawing Sheets

| FIG. 9A |
|---------|
| FIG. 9B |

FIG. 9B

| | t0 | t1 | t2 | t3 | t4 | t5 | t6 | t7 | t8 | t9 | t10 | t11 |
|---|---|---|---|---|---|---|---|---|---|---|---|---|
| L1: /A/ charac position | | | | | | | | | | | 7 | |
| L2: /A/ charac position | | | | | | 5 | | | | | 7 | |
| L3: /A/ charac position | | | | | | | | | 3 | | 7 | |
| L4: /A/ charac position | | | | | | | | | | | 7 | |
| | | | | | | | | | | | | { 910 |
| L1: Deskw_Charac_Out | 1E | 7C | 1C | 9C | 9C | 05 | 09 | 1E | 9C | 01 | 05 | |
| L2: Deskw_Charac_Out | 1E | 7C | 1C | 9C | 9C | 05 | 0A | 1E | 9C | 01 | 05 | |
| L3: Deskw_Charac_Out | 1A | 1B | 1C | 1D | 7C | 7C | 1C | 1E | 9C | 01 | 05 | |
| L4: Deskw_Charac_Out | 1C | 1D | 1E | 7C | 9C | 9C | 01 | 1E | 9C | 01 | 05 | |
| | | | | | | | | | | | | { 920 |
| L1 Charac_SREG_1 | 01E | 17C /A/ | 11C | 19C | 001 | 005 | 009 | 003 | 000 | 01F | 001 | |
| L1 Charac_SREG_2 | 01D | 01E | 17C /A/ | 11C | 19C | 001 | 005 | 009 | 003 | 000 | 01F | |
| L1 Charac_SREG_3 | 01C | 01D | 01E | 17C /A/ | 11C | 19C | 001 | 005 | 009 | 003 | 000 | |
| L1 Charac_SREG_4 | 01B | 01C | 01D | 01E | 17C /A/ | 11C | 19C | 001 | 005 | 009 | 003 | |
| L1 Charac_SREG_5 | 01A | 01B | 01C | 01D | 01E | 17C /A/ | 11C | 19C | 001 | 005 | 009 | |
| L1 Charac_SREG_6 | 019 | 01A | 01B | 01C | 01D | 01E | 17C /A/ | 11C | 19C | 001 | 005 | |
| L1 Charac_SREG_7 | 018 | 019 | 01A | 01B | 01C | 01D | 01E | 17C /A/ | 11C | 19C | 001 | |
| | 017 | 018 | 019 | 01A | 01B | 01C | 01D | 01E | 11C | 19C | 001 | { 930 |

APPARATUS AND METHOD FOR DESKEWING SERIAL DATA TRANSMISSIONS

CROSS-REFERENCE TO RELATED APPLICATIONS

This application is related to APPARATUS AND METHOD FOR DESKEWING SERIAL DATA TRANSMISSIONS (Inventor: Michael Hennedy; Ser. No. 13/044,443, filed on even date herewith), the disclosure of which is incorporated by reference in its entirety herein.

BACKGROUND

1. Field

Embodiments of the invention relate to electronic devices, and more particularly, in one or more embodiments, to serial data transmission for electronic devices.

2. Description of the Related Technology

Many electronic systems use serial data transmission between devices. Certain electronic systems transmit serial data streams, using multiple links or lanes for effective data communications.

In such instances, it is desirable that the serial data streams that are transmitted over multiple links or lanes are synchronized for data integrity of the system. However, serial data transmission over multiple links or lanes is susceptible to various sources of skew, such as temperature and board layout. The term "skew" refers to a phenomenon in which signals transmitted simultaneously from one or more devices arrive at one or more other devices at different times. Particularly, in electronic systems using high-speed (for example, 3 gigabits per second (Gbps) or greater) transmission, skews among multiple links or lanes can significantly degrade the data integrity of the systems. Thus, there is a need for deskewing multiple serial data streams to maintain data integrity.

SUMMARY

In one embodiment, an apparatus includes a plurality of receivers, each of the receivers being configured to receive a serial data stream. Each of the receivers comprises: a shift register comprising a plurality of stages configured to propagate a stream of characters in sequence, each of the stages being configured to store a character, and to shift the character to a next stage of the shift register in response to a clock signal; and a multiplexer having a plurality of inputs, each of the inputs being electrically coupled to a respective one of the stages of the shift register, and configured to select one of the stages to generate an output for the multiplexer. The apparatus further comprises a multiplexer control circuit configured to control selection by the multiplexers such that the outputs of the multiplexers of the receivers are deskewed.

In another embodiment, a method of deskewing multiple serial data streams received over multiple lanes is provided. The method comprises: generating a plurality of character streams from the multiple serial data streams; propagating the plurality of character streams through a plurality of shift registers, each of the shift registers including a plurality of stages arranged in sequence to propagate a respective one of the character streams, each of the stages being configured to store a character, and shift the character to a next stage in response to a clock signal; and selecting one of the stages of each of the shift registers for an output such that the selected outputs from the shift registers are deskewed.

In yet another embodiment, an apparatus comprises one or more receivers, each of the receivers being configured to receive a serial data stream. Each of the receivers comprises: a shift register comprising a plurality of stages configured to propagate a stream of characters in sequence, wherein the shift register is configured to detect a special character in the stream of characters; and a multiplexer having a plurality of inputs, each of the inputs being electrically coupled to a respective one of the stages of the shift register, and configured to select one of the stages to generate an output for the multiplexer; and a logic circuit configured to transmit, to outside the apparatus, information associated with a timing of detection of the last special character received by the one or more receivers.

In yet another embodiment, a system comprises: a plurality of receiver devices, each of the receiver devices being configured to receive one or more serial data streams. Each of the receiver devices includes: a shift register including a plurality of stages arranged in sequence to propagate a stream of characters, wherein the shift register is configured to detect a special character in the stream of characters; a multiplexer having a plurality of inputs, each of the inputs being electrically coupled to a respective one of the stages of the shift register, and to select one of the stages to generate an output; and a logic circuit configured to transmit information on detection of the last special character received by the receiver device to the other receiver devices.

In yet another embodiment, a method of deskewing multiple serial data streams received by multiple receiver devices over multiple links is provided. The method comprises: generating, by one of the receiver devices, at least one character stream from at least one of the multiple serial data streams; propagating the at least one character stream through at least one shift register in the receiver device, the at least one shift register including a plurality of stages arranged in sequence to propagate a respective one of the character streams; detecting, by the at least one shift register, a special character in the at least one character stream; and transmitting, by a logic circuit in the receiver device, information on detection of the special character to the other receiver devices.

DETAILED DESCRIPTION OF EMBODIMENTS

Figure 1:
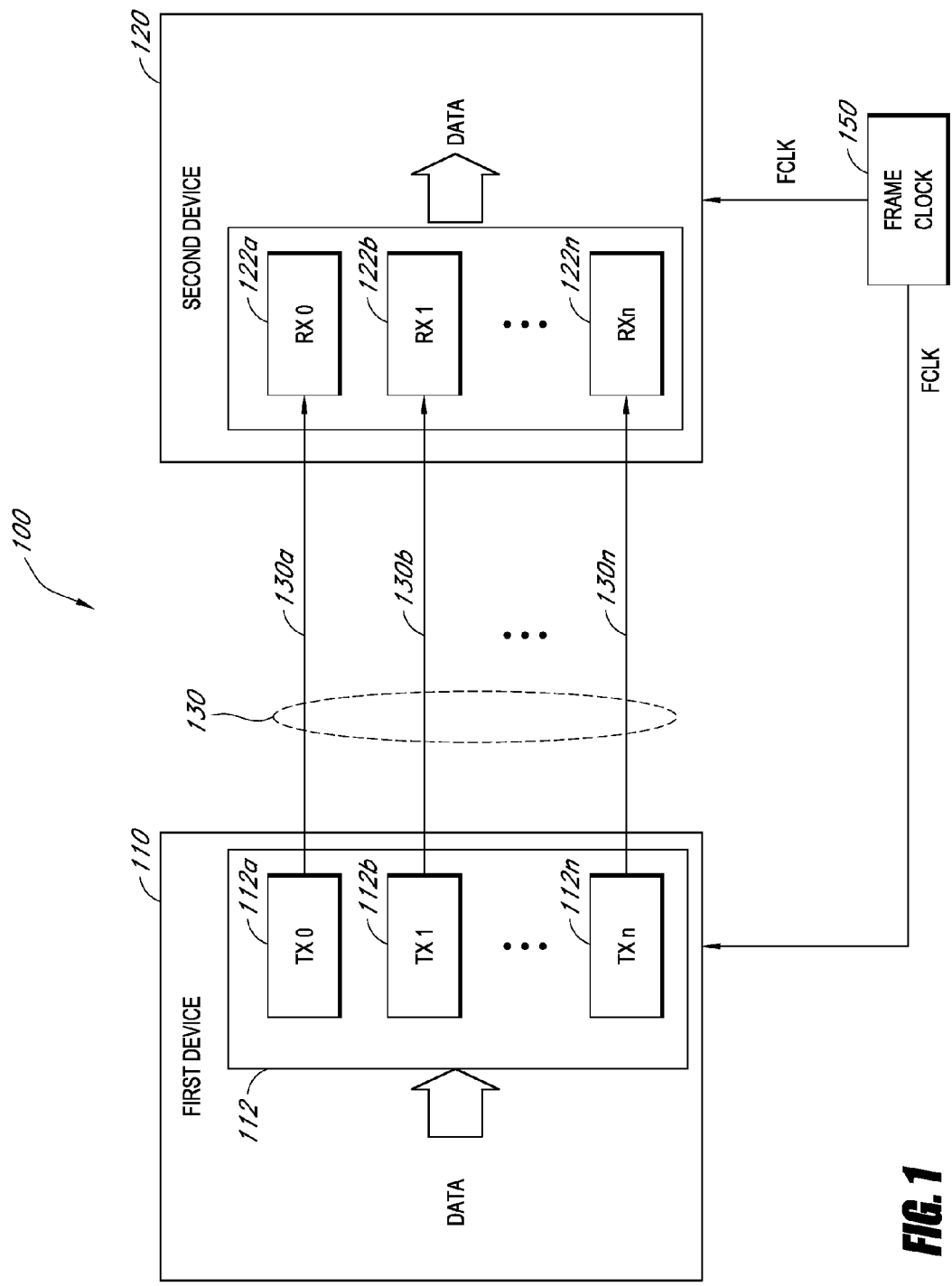
FIG. 1 is a schematic block diagram illustrating an example electronic system including two devices connected via multiple serial lanes.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Overview of Electronic Systems Having Serial Links

Referring to FIG. 1, an electronic system for transmitting data via a serial link according to one embodiment will be described below. The illustrated system 100 includes a first device 110, a second device 120, a serial link 130 including a plurality of serial lanes 130a-130n, and a frame clock generator 150. The term "link" refers to a data communication path between two devices, and a link can include one or more lanes, each of which provides electrical connection between a transmitter and a receiver in the two devices.

In one embodiment, the first device 110 can be an analog-to-digital converter (ADC) device, and the second device 120 can be a logic device, such as a field-programmable gate array (FPGA), a programmable logic device (PLD), an application-specific integrated circuit (ASIC), or the like. In another embodiment, the first device 110 can be a logic device, and the second device 120 can be a digital-to-analog converter (DAC) device. A skilled artisan will, however, appreciate that the first and second devices 110, 120 can be any type of devices capable of communicating serial data with each other.

While the illustrated embodiment is described in the context of a unidirectional data transmission, the principles and advantages of the embodiment can apply to other embodiments, in which the first and second devices 110, 120 are capable of bi-directional data transmission/reception.

In one embodiment, the first device 110 can be a transmitter device that includes a transmitter block 112, which includes a plurality of transmitters 112a-112n. In the context of this document, the term "transmitter device" refers to a component package containing one or more transmitter blocks. The term "transmitter block" can refer to a combination of a transmitter transport layer, transmitter link layer, and/or physical layer blocks connected to a link. The term "transmitter" can refer to a circuit that serializes input frames and transports the resulting bit stream across a lane.

The transmitter block 112 receives data, for example, parallel data, from one or more components (for example, an application logic module or ADCs) of the first device 110. The transmitter block 112 converts the data into multiple serial data streams, and transmits the data streams, using the plurality of transmitters 112a-112n, through the serial lanes 130a-130n, to the second device 120. Each of the serial lanes 130a-130n can include either a single line for single-ended signaling, or a pair of lines for differential signaling. In the context of this disclosure, n does not necessarily mean 12 but an arbitrary number "n."

The second device 120 can be a receiver device which includes a receiver block 122, which includes a plurality of receivers 122a-122n. In the context of this document, the term "receiver device" refers to a component package containing one or more receiver blocks. The term "receiver block" can refer to a combination of a receiver transport layer, receiver link layer, and/or physical layer blocks connected to a link. The term "receiver" can refer to a circuit attached to a lane for reconstructing a serial bit stream into time-aligned frames.

The receivers 122a-122n receive the serial data streams from the transmitters 112a-112n, respectively, via the serial lanes 130a-130n, and convert the serial data streams to parallel data. The receiver block 122 provides the data to one or more components (for example, application logic or DACs) of the second device 120.

The frame clock signal generator 150 serves to generate a frame clock signal FCLK, and send it to the first and second devices 110, 120. In one embodiment, the frame clock signal FCLK can have a frequency of about 10 MHz to about 600 MHz. The frame clock signal FCLK can be used by the first and second devices 110, 120, for example, for synchronization of data transmission between the devices 110, 120 and/or between the serial lanes 130a-130n.

Figure 2:
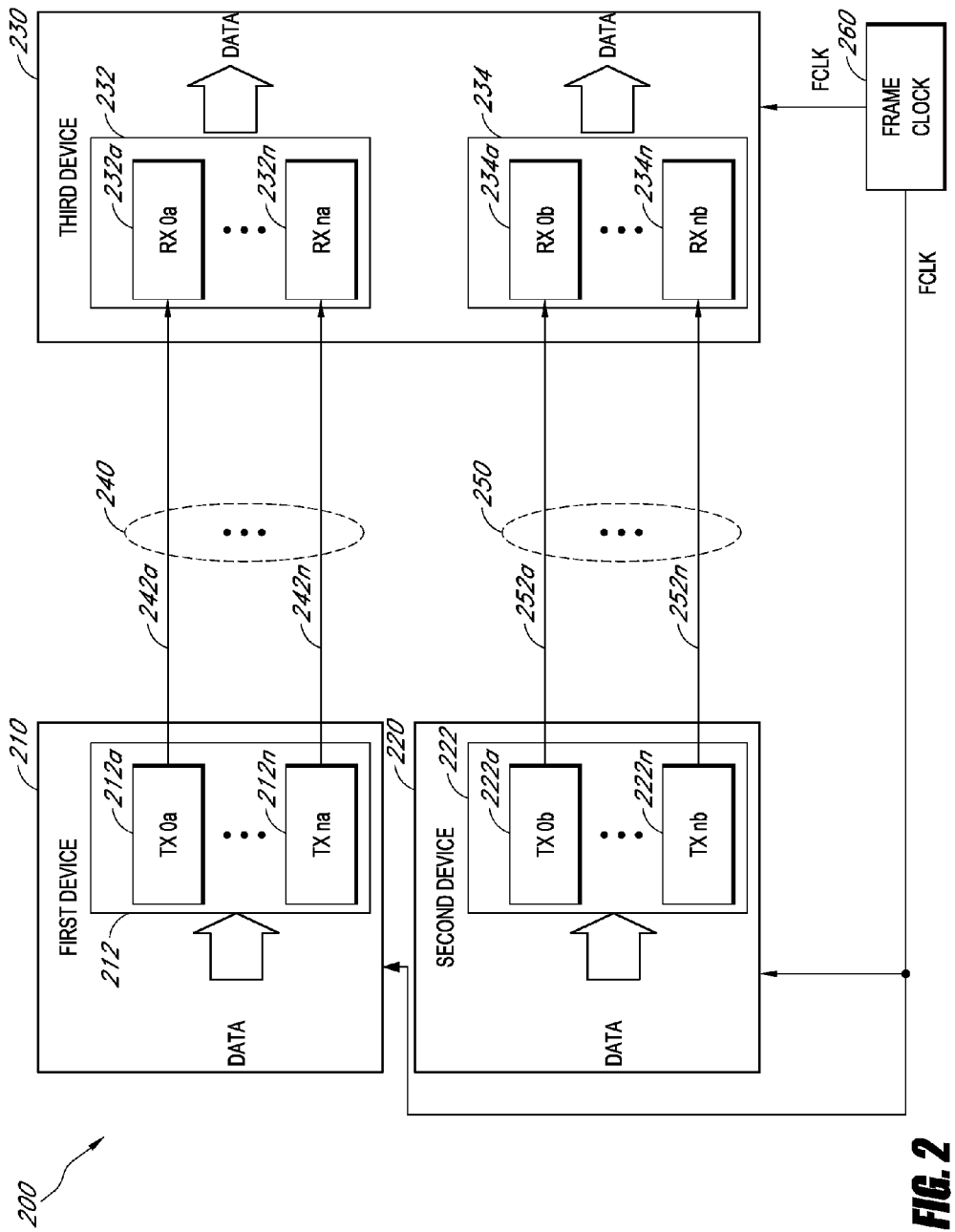
FIG. 2 is a schematic block diagram illustrating another example electronic system including two transmitter devices and one receiver device connected via two links, each of which includes multiple serial lanes.

Referring to FIG. 2, an electronic system for transmitting data via multiple serial links according to another embodiment will be described below. The illustrated system 200 includes a first device 210, a second device 220, a third device 230, a first serial link 240, a second serial link 250, and a frame clock generator 260. The first serial link 240 can include a plurality of first serial lanes 242a-242n. The second serial link 250 can include a plurality of second serial lanes 252a-252n.

In one embodiment, each of the first device 210 and the second device 220 can be an analog-to-digital converter (ADC) device, and the third device 230 can be a logic device, such as a field-programmable gate array (FPGA), a programmable logic device (PLD), an application-specific integrated circuit (ASIC), or the like. In another embodiment, each of the first device 210 and the second device 220 can be a logic device, and the third device 230 can be a digital-to-analog converter (DAC) device. A skilled artisan will, however, appreciate that the first to third devices 210-230 can be any type of devices that transmit and/or receive serial data.

While the illustrated embodiment is described in the context of a unidirectional data transmission, the principles and advantages of the embodiment can apply to other embodiments, in which the first to third devices 210-230 are capable of bi-directional data transmission/reception.

In the illustrated embodiment, the first and second devices 210, 220 can include first and second transmitter blocks 212, 222, respectively, each of which includes a plurality of transmitters 212a-212n, 222a-222n. The first and second transmitter blocks 212, 222 receive data, for example, parallel data, from one or more components (for example, an application logic module or ADCs) of the first and second devices 210, 220, respectively.

The first transmitter block 212 converts the data into multiple serial data streams and transmits the data streams, using the plurality of first transmitters 212a-212n, through the first serial lanes 242a-242n, to the third device 230. Each of the first serial lanes 242a-242n can include either a single line for single-ended signaling, or a pair of lines for differential signaling.

The second transmitter block 222 converts the data into multiple serial data streams, and transmits the data streams, using the plurality of second transmitters 222a-222n, through the second serial lanes 252a-252n, to the third device 230. Each of the second serial lanes 252a-252n can include either a single line for single-ended signaling, or a pair of lines for differential signaling.

The third device 230 can include first and second receiver blocks 232, 234, which include first receivers 232a-232n and second receivers 234a-234n, respectively. The first receivers 232a-232n receive the serial data streams from the first transmitters 212a-212n via the first serial lanes 242a-242n, and convert the serial data streams to parallel data. The second receivers 234a-234n receive the serial data streams from the second transmitters 222a-222n via the second serial lanes 252a-252n, and convert the serial data streams to parallel data. The receiver blocks 232, 234 provide the data to one or more components (for example, application logic or DACs) of the third device 230.

The frame clock generator 260 serves to generate a frame clock signal FCLK, and send it to the first through third devices 210-230. The frame clock signal FCLK can be used by the first through third devices 210-230, for example, for synchronization of data transmission between the devices 210-230 and/or between the serial lanes 242a-242n, 252a-252n.

Deskewing Multiples Lanes on a Single Receiver Device

Serial data communications over multiple serial links or lanes between two or more devices (for example, the devices 110, 120, and 210-230 shown in FIGS. 1 and 2) can be susceptible to various sources of skew. Such a skew may adversely affect the data integrity of a data communication system.

In each of the embodiments of FIGS. 1 and 2, there is a single receiver device that receives multiple data streams from one or more transmitter devices. A method of deskewing multiple lanes on a single receiver device will be described below in connection with FIGS. 3-9.

In one embodiment, a receiver device includes a plurality of receivers, each of which receives a serial data stream from a serial lane. Each of the serial data streams can contain a preamble sequence, which includes a unique periodic alignment character (alternatively referred to as a "special character").

Each of the receivers can include a deskewer for detecting such a special character transmitted through a respective one of the lanes during an initialization period or a regular data transmission period. The deskewers of the receivers can together form a snap shot of skews among the lanes by determining time differences in detecting the special characters among the lanes, which would otherwise be detected simultaneously without skews.

After the deskewers obtain the snap shot of skews, the deskewers put out data from the lanes, based at least partly on the snap shot. In one embodiment, each of the deskewers can include a shift register having multiple stages, and one of the stages in each of the shift registers is selected to compensate for the skews. The shift registers can buffer octets in order to select a shifted output that compensates for the skew with the other lanes. Then, octets in the selected stages of the shift registers of the deskewer are driven out simultaneously to reduce or eliminate skews.

Figure 3:
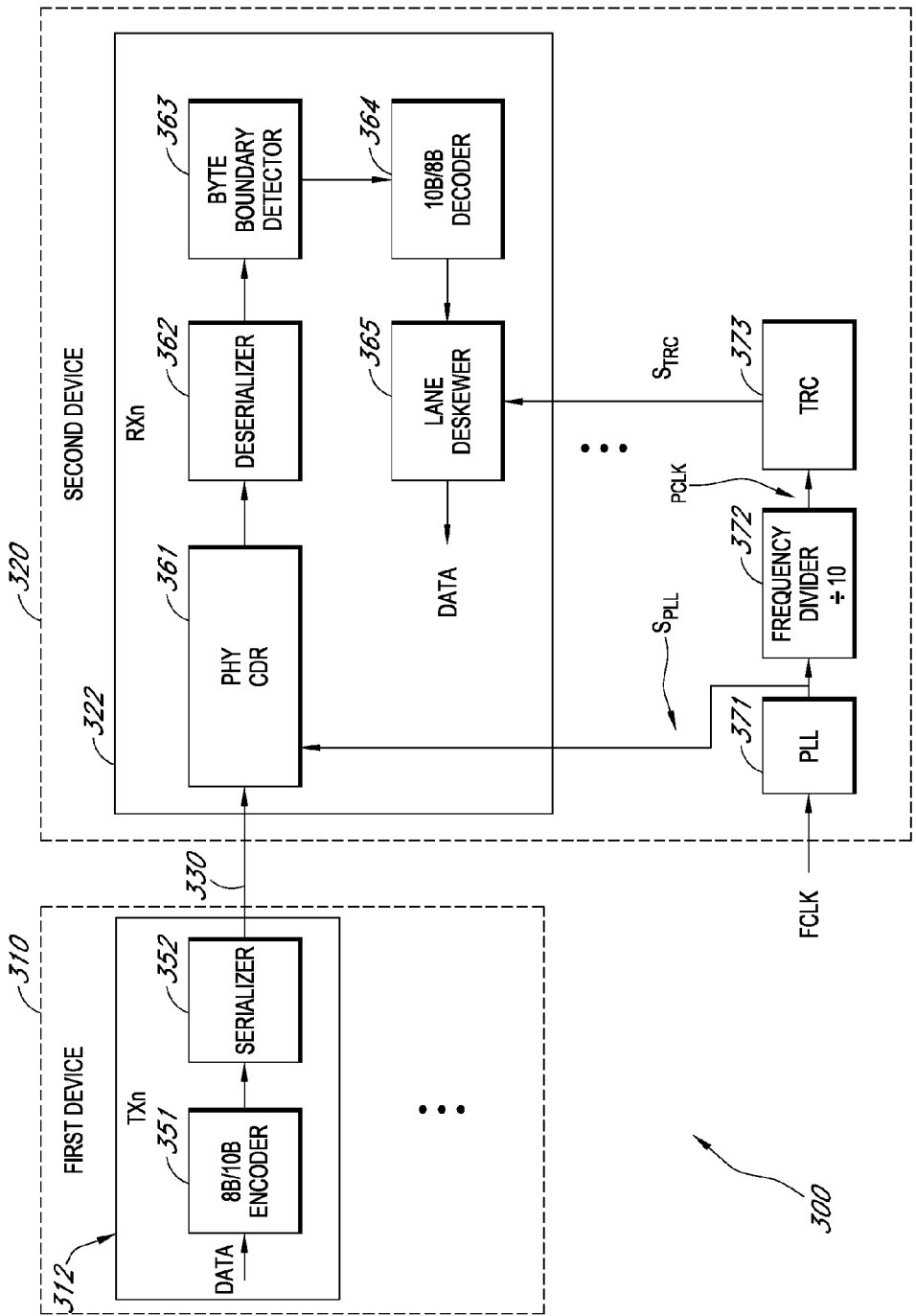
FIG. 3 is a schematic block diagram illustrating a transmitter and a receiver connected via a serial lane according to one embodiment.

Referring to FIG. 3, a serial data communication system according to one embodiment will be described below. FIG. 3 is a partial block diagram of a data communication system 300 including a first device 310, a second device 320, and a serial lane 330. The first device 310 includes a plurality of transmitters 312, only one of which is illustrated in FIG. 3 for the sake of clarity. The second device 320 includes a plurality of receivers 322, only one of which is illustrated in FIG. 3 for the sake of clarity. In addition, the system 300 can include a plurality of serial lanes, only one of which is illustrated in FIG. 3 for the sake of simplicity.

For example, the transmitter 312 can be any one of the transmitters 112a-112b in the first device 110 of FIG. 1, the transmitters 212a-212n in the first device 210 of FIG. 2, or the transmitters 222a-222n in the second device 220 of FIG. 2. The receiver 322 can be a receiver that is linked via a serial lane to the transmitter 312, which can be one of the receivers 122a-122n in the second device 120 of FIG. 1, or the receivers 232a-232n, 234a-234n in the third device 230 of FIG. 2. For example, the transmitter 312 and the receiver 322 can be the first transmitter 112a and the first receiver 122a, respectively, of FIG. 1. In such an instance, the serial lane 330 can be the first serial lane 130a of FIG. 1.

In the illustrated embodiment, the transmitter 312 can include an encoder 351 and a serializer 352. The encoder 351 can be, for example, an 8B/10B encoder which maps 8-bit symbols to 10-bit symbols. The 8B/10B encoder can be used to remove a DC component, which helps data/clock recovery at the receivers. In the context of this document, the term "symbol" refers to the smallest unit of coded data, and can be alternatively referred to as "character." A symbol can include multiple bits, for example, 8 bits. In such an instance, a symbol can be referred to as "octet" or "byte." In addition, a group of eight adjacent binary bits can be referred to as an "octet." The encoder 351 can receive a parallel data stream at a rate of, for example, about 300 Mbps. In other embodiments, other types of encoders can be used in place of the 8B/10B encoder, depending on the protocol used by the system 300.

The serializer 352 can convert parallel data (for example, 10-bit symbols) from the encoder 351 into a serial data stream for transmission over the serial lane 330. The serializer 352 can output the serial data stream at a rate of, for example, about 375 Mbps. While not illustrated, the transmitter 312 can have other components for processing and transmitting data.

The receiver 322 can include a physical layer (PHY) clock and data recovery (CDR) module 361, a deserializer 362, a byte boundary detector 363, a decoder 364, and a lane deskewer 365. The PHY CDR module 361 serves to perform clock and data recovery to generate a clock signal from a data stream transmitted over the serial lane 330. Further, the PHY CDR module 361 provides the data stream to the deserializer 362.

The deserializer 362 serves to convert the data stream, in a form of serial data stream, into a parallel form (for example, 10-bit symbols). The deserializer 362 can output parallel data at a rate of, for example, 375 Mbps. The byte boundary detector 363 serves to detect a proper boundary of a set of bits that form a data unit (for example, 10-bit symbols).

The decoder 364 can be, for example, a 10B/8B decoder which maps 10-bit symbols back to 8-bit symbols, which is the original form of data at the transmitter 312 before the 8B/10B encoder 351. The decoder 364 can output 8-bit symbols at a rate of, for example, 300 megabits per second (Mbps), which is substantially the same as the rate at which the 8B/10B encoder 351 of the transmitter 312 receives parallel data.

The lane deskewer 365 serves to reduce or eliminate skews among serial lanes. In FIG. 3, only a single transmitter, a single receiver, and a single serial lane are shown for the sake of simplicity. However, as shown in FIGS. 1 and 2, multiple transmitters, multiples receivers, and multiple serial lanes can be used between two devices. In such an instance, there can be skews among the lanes and/or the receivers. Each of the receivers 322 in the second device 320 can include a lane deskewer 365. The deskewers in the receivers in the second device 320 can operate together to reduce or eliminate skews, as will be described later in detail. The deskewer 365 provides deskewed data for further processing in the receiver 322.

The second device 320 can also include a phase-locked loop (PLL) 371, a frequency divider 372, and a timing reference counter (TRC) 373 that can be shared among the receivers 322. The PLL 371 serves to receive a frame clock signal FCLK from a frame clock generator (for example, the frame clock generators 150, 260 in FIGS. 1 and 2), and provides a PLL signal $S_{PLL}$ in phase with the frame clock signal FCLK. The PLL signal $S_{PLL}$ is provided to the PHY CDR module 361 of each of the receivers 322 in the second device 320 and to the frequency divider 372.

The frequency divider 372 serves to divide the frequency of the PLL signal $S_{PLL}$ to generate a processing clock PCLK. In the illustrated embodiment, the frequency divider 372 divides the frequency of the PLL signal $S_{PLL}$ by 10. A skilled artisan will appreciate that the frequency of the PLL signal $S_{PLL}$ can be divided by any suitable number, depending on the system's needs. In another embodiment, the processing clock PCLK can be generated by (1) recovering a data clock from a data signal (which is transmitted via the serial lane 330), using, for example, the PHY CDR module 361, and (2) dividing the data clock by 10, using, for example, the frequency divider 372.

The timing reference counter (TRC) 373 starts counting a number in synchronization with the processing clock PCLK upon receiving a triggering signal from any of the deskewers in the receivers, and generate a TRC signal $S_{TRC}$ as a timing reference. The TRC 373 can be preset with a selected value (for example, 7) in the illustrated embodiment. The TRC signal $S_{TRC}$ can be provided to the lane deskewer 365 of each of the receivers 322 in the second device 320.

Figure 4A:
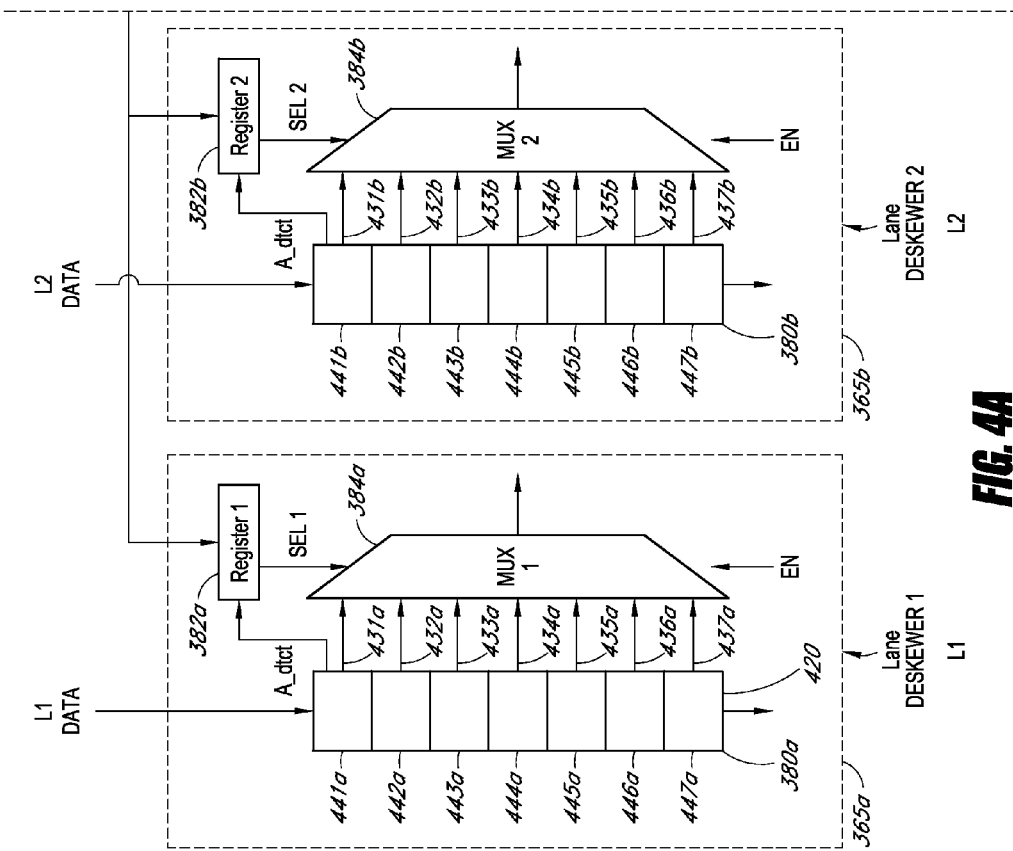
FIG. 4 consists of FIGS. 4A and 4B, and is a schematic block diagram illustrating lane deskewers according to one embodiment.
Figures 4, 4B:
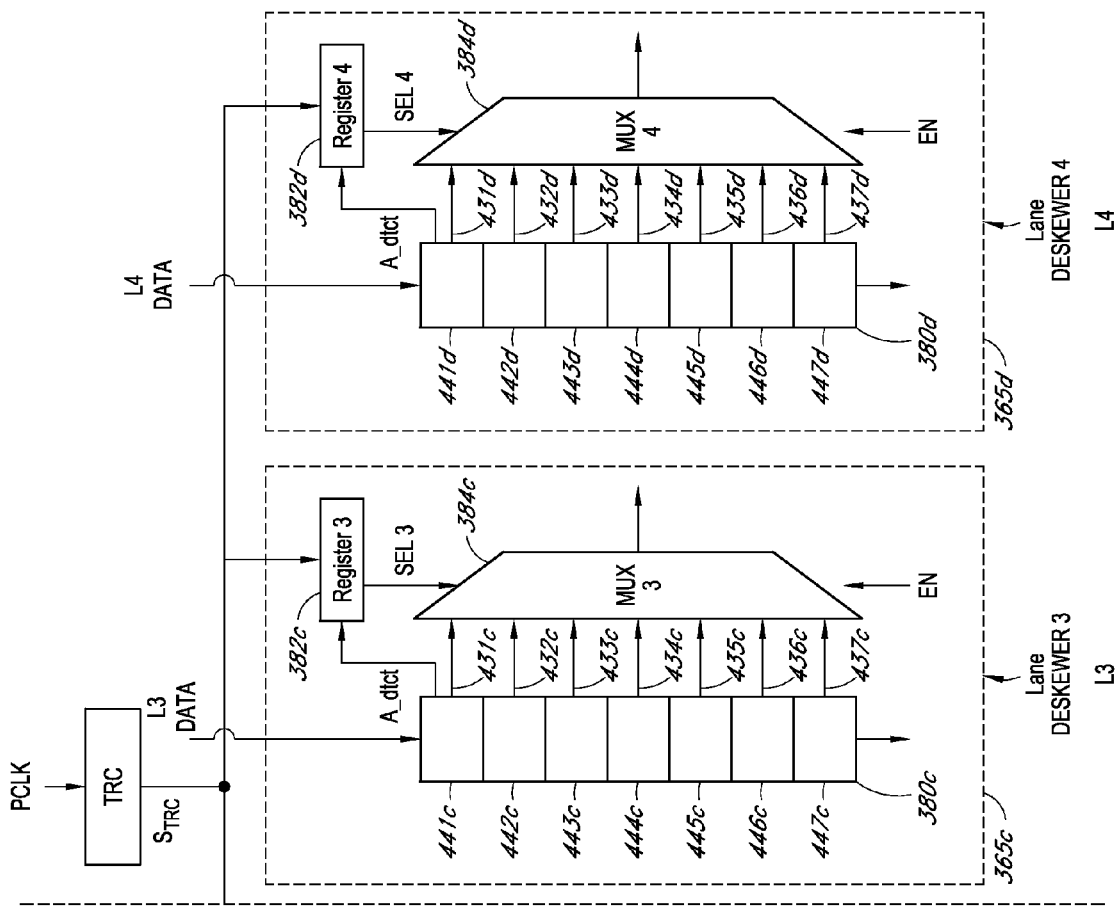

Referring to FIG. 4, a receiver device including lane deskewers according to one embodiment will be described below. In the illustrated embodiment, the receiver device 400 includes a timing reference counter (TRC) 373 and first to fourth lane deskewers 365a-365d. The device 400 can include any number of deskewers, depending on the number of receivers or lanes that are to be deskewed.

Each of the lane deskewers 365a-365d can be part of a respective one of receivers in the receiver device 400. For example, each of the lane deskewers 365a-365d can be part of a respective one of the receivers 122a-122n of the second device 120 of FIG. 1, or the receivers 232a-232n, 234a-234n of the third device 230 of FIG. 2. Further, the receiver device 400 can include other components, such as the components 361-364, 371, 372 shown in FIG. 3.

As described above in connection with FIG. 3, the timing reference counter (TRC) 373 provides a TRC signal $S_{TRC}$ at least partly in response to the processing clock PCLK. The TRC signal $S_{TRC}$ is provided to each of the first to fourth lane deskewers 365a-365d. Each of the first to fourth lane deskewers 365a-365d can include a shift register 380a-380d, a count register 382a-382d, and a multiplexer 384a-384d.

Each of the shift registers 380a-380d can receive a parallel data stream (for example, a stream of octets) from a respective one of first to fourth serial lanes L1-L4 via, for example, a decoder (for example, the 10B/8B decoder 364 of FIG. 3) in a respective one of the receivers. Each of the shift register 380a-380d can be a character-wide or byte-wide shift register. In the illustrated embodiment, each of the shift register 380a-380d includes a serial input 410, a serial output 420, and seven parallel outputs 431a-437a, 431b-437b, 431c-437c, 431d-437d.

Each of the shift registers 380a-380d can include a plurality of stages 441a-447a, 441b-447b, 441c-447c, 441d-447d forming a data delay array, and stores a data unit (for example, one byte or octet of data) in each of the stages 441a-447a, 441b-447b, 441c-447c, 441d-447d at a time. The maximum skew between any pair of the serial lanes on the receiver device is denoted to SK, which is an integer number of clock cycles of the processing clock PCLK. In the illustrated embodiment, SK has a value of 6 clock cycles, but SK can be any other value, depending on the system. The number of stages in the shift registers 380a-380d is SK+1, and thus each of the shift registers 380a-380d has seven stages in the illustrated embodiment. However, a skilled artisan will appreciate that the number of stages in the shift registers 380a-380d can vary widely, depending on the allowable range of skew in the system.

A data unit, when received by one of the shift registers 380a-380d, is stored in the first stage 441a, 441b, 441c, 441d of the shift register 380a-380d. The data unit is then shifted to the second stage 442a, 442b, 442c, 442d at a next clock. In this manner, the data unit is shifted toward the seventh stage 447a, 447b, 447c, 447d, and is driven out on the processing clock PCLK. This process is repeated for all the data units in data streams received by the shift registers 380a-380d.

The first stage 441a, 441b, 441c, 441d of each of the shift registers 380a-380d is configured to detect a selected character or symbol in the data stream. In the context of this document, the term "selected character" or "selected symbol" can be alternatively referred to as "alignment character," "special character," "alignment symbol," "special symbol," "designated character," or "designated symbol." When the selected character is detected, each of the shift registers 380a-380d sends a detection signal A_dtct to a respective one of the count registers 382a-382d. Other details of the operation of the shift registers 380a-380d will be described in connection with FIG. 5-9.

Each of the count registers 382a-382d can receive the TRC signal $S_{TRC}$ from the TRC 373. Each of the count registers 382a-382d can store the current count or value of the TRC signal $S_{TRC}$ upon receiving a detection signal A_dtct from a respective one of the shift registers 380a-380d. When all of the registers 382a-382d have stored counts or values indicating when their respective shift register 380a-380d has received selected character, each of the count registers 382a-382d provide selection signals SEL1-SEL4 to a respective one of the multiplexers 384a-384d.

Each of the multiplexers 384a-384d has a plurality of multiplexer inputs electrically coupled to the parallel outputs 431a-437a, 431b-437b, 431c-437c, 431d-437d of a respective one of the shift registers 380a-380d, and a single multiplexer output. Each of the multiplexers 384a-384d is configured to output a data unit from a selected parallel output at least partly in response to the selection signal SEL1-SEL4 from a respective one of the count registers 382a-382d, and an enable signal EN.

Figure 5:
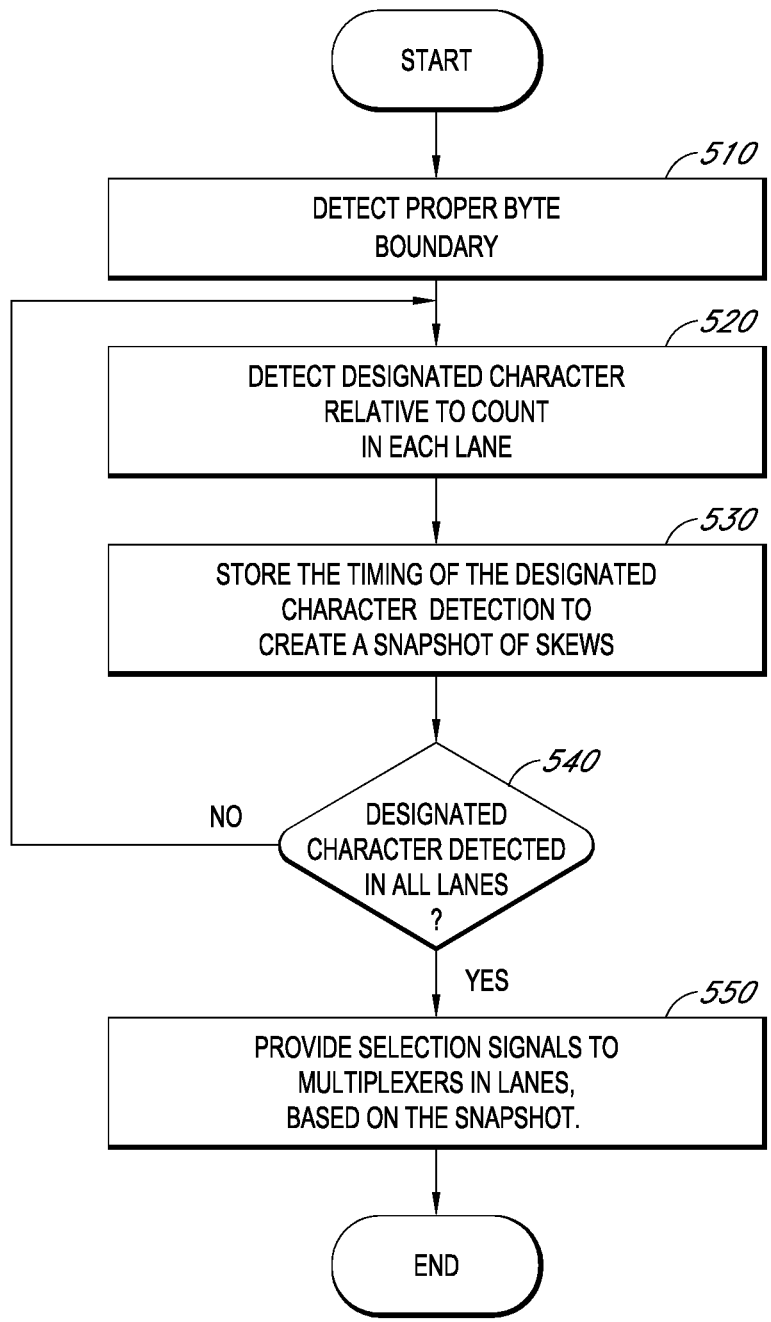
FIG. 5 is a flowchart illustrating a process of deskewing serial data transmitted to a single device over multiple lanes.

Referring now to FIGS. 3-5, a method of deskewing serial lanes in a single receiver device according to one embodiment will be described below. As shown in FIG. 5, at the step 510, a proper byte boundary can be detected by the byte boundary detector 363 of FIG. 3. Once a proper byte boundary has been detected, a selected character in a data stream can be detected at the step 520 with reference to the count or value of the TRC signal $S_{TRC}$ by the first stage 441a, 441b, 441c, 441d of each of the shift registers 380a-380d. Subsequently, the count of the TRC signal $S_{TRC}$ indicating the timing when the selected character was detected is stored in a respective one of the count registers 382a-382d at the step 530. The counts stored in the count registers 382a-382d create a snapshot of skews among the lanes.

At step 540, it is determined whether the selected character has been detected in all the lanes (by the shift registers 380a-380d). If true, the process proceeds to the step 550, in which the multiplexers 384a-384d in all the lanes are addressed to selectively output data from a stage of the shift registers 380a-380d, based on the snapshot of the skews. If no at step 540, the process returns to step 520. In certain embodiments, if any of the shift registers 380a-380d fails to detect a selected character within a selected period (for example, a period of 7 PCLKs), all the deskewers can reset their respective detection signals and retry detection on selected characters in the following data stream.

Figure 6:
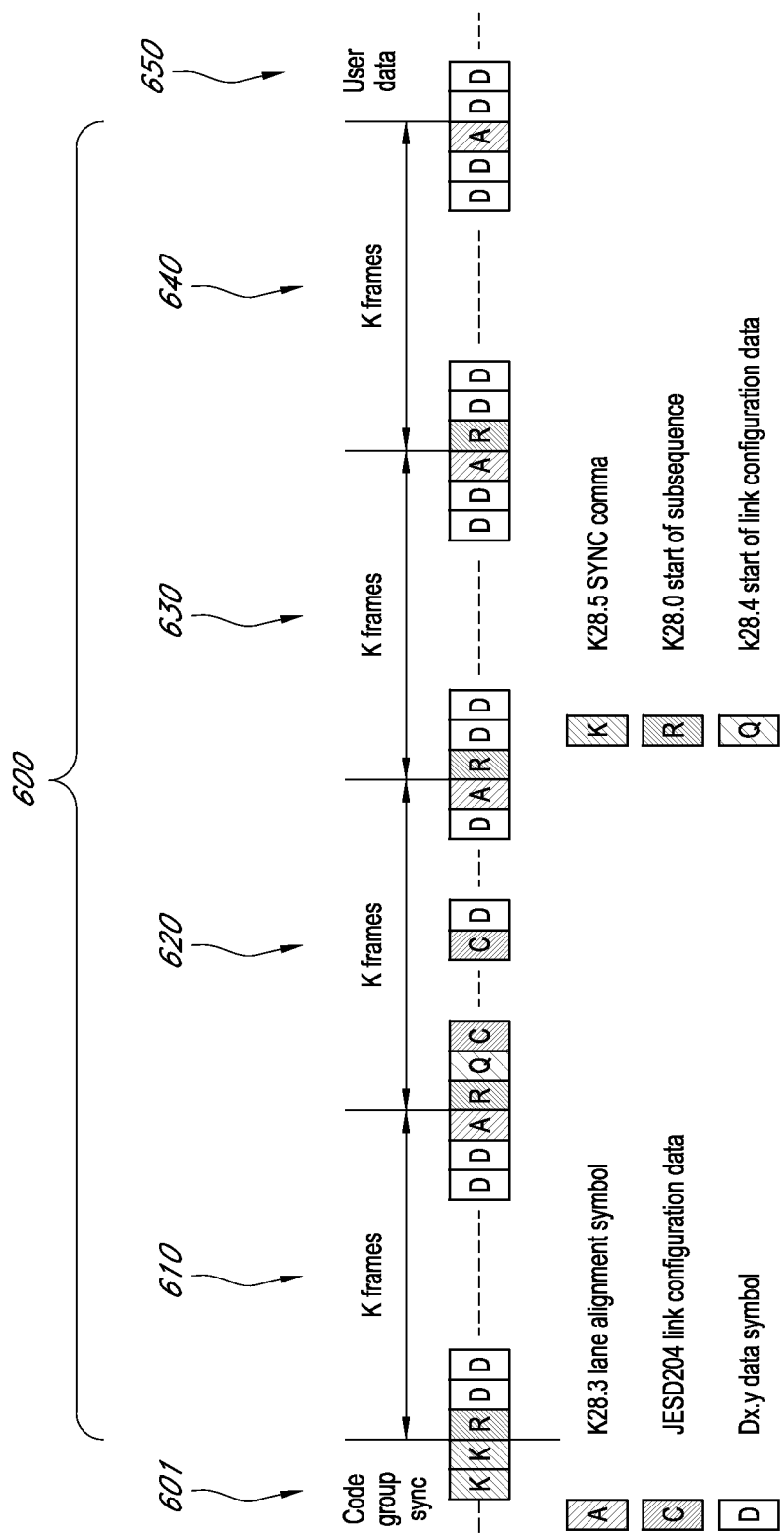
FIG. 6 is a timing diagram illustrating an initial lane alignment sequence according to the JESD204A standard.

Referring to FIG. 6, a method of deskewing lanes in a single receiver device according to one embodiment will be described below. FIG. 6 shows a sequence of frames for initial lane alignment (which can be referred to as an "initial lane alignment sequence (ILS)") between a transmitter and a receiver, which is described in the JEDEC Standard (Serial Interface for Data Converters), particularly, the JESD 204A standard (for example, Revision dated April 2006).

As in the JESD 204A standard, in the context of this document, the term "frame" can refer to a set of consecutive data units (for example, octets) in which the position of each data unit can be identified by reference to a frame alignment signal. The term "multiframe" refers to "a set of consecutive frames in which the position of each frame can be identified by reference to a multiframe alignment signal. While the illustrated embodiment is described in connection with the initial alignment of the JESD 204A standard, the principles and advantages of the embodiment can apply equally to other systems or standards.

In the illustrated embodiment, K number of frames form a multiframe. The value of K can be selected by a user, and is programmable. Thus, a multiframe can include K*F data units (for example, octets), in which F is the number of data units per frame. In one embodiment, the value of F can be between 1 and 8, and the value of K can be between 1 and 32. The minimum value for K*F octets can be, for example, 17.

The initial lane alignment sequence 600 starts after K28.5 SYNC comma characters 601, which provide code group synchronization, are transmitted from the transmitter. After the K28.5 SYNC comma characters 601, each of first to fourth multiframes 610-640 starts with a character /R/ and ends with a character /A/. Each of characters can be an octet in the context of the embodiments described herein. The character /R/ is an indication to the receiver that the multiframe is part of an initial lane alignment sequence. The character /A/ indicates the end of the multiframe, and can be used for both lane and frame synchronization. The character /A/ is a unique alignment character as the last octet of every multiframe 610-640.

The first multiframe 610 can have data characters or symbols between its characters /R/ and /A/. The second multiframe 620 can have a character /Q/ indicating the start of link configuration data, and characters /C/ indicating JESD 204A link configuration data between its characters /R/ and /A/. The third and fourth multiframe 630, 640 can have data symbols /D/ between its characters /R/ and /A/. After the initial lane alignment sequence 600, user data /D/, denoted as "650" is transmitted from the transmitter to the receiver. Any of the first few multiframes 610-640 of an initial alignment sequence (ILS) can be used for deskewing multiple lanes on a single receiver device. FIG. 6 is illustrative of one embodiment, and various other lane alignment sequences can be used in other embodiments.

In the illustrated embodiment, the character /A/ is used to indicate the end of a multiframe. The character /A/ is distinguished from other characters or data. Such a special character, not limited to the character /A/, can be used for deskewing lanes, as will be described below. In the illustrated embodiment, a deskewing process is performed during initial lane alignment before regular data transmission. However, a skilled artisan will appreciate that a deskewing process can be performed after initial alignment, for example, during regular data transmission, using a unique and repetitive character.

Referring to FIGS. 4, 6, 7A-7D, and 8, a method of deskewing lanes according to one embodiment will be described below. FIGS. 7A-7D illustrate the first to fourth shift registers 380a-380d for receiving data streams from the first to fourth lanes L1-L4, respectively, which were described earlier in connection with FIG. 4.

Figure 7A:
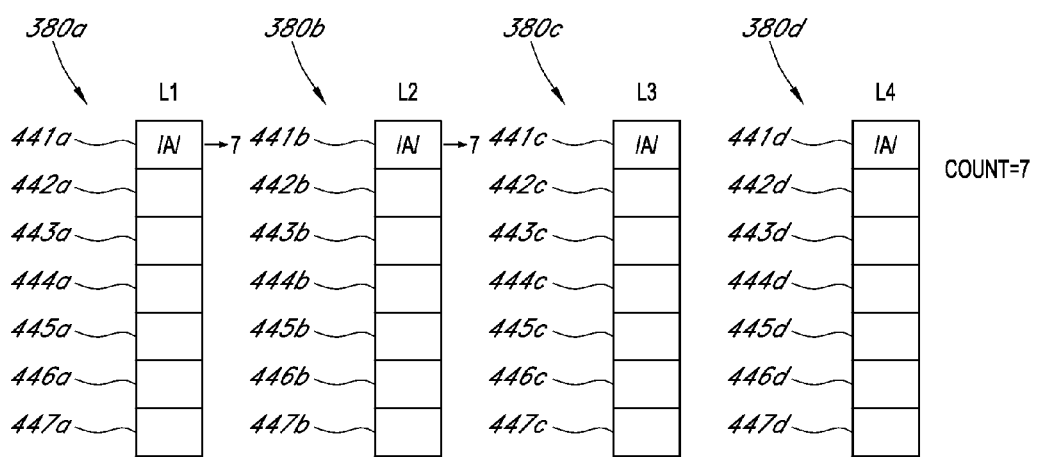
FIGS. 7A-7D are schematic block diagrams of four shift registers in lane deskewers according to one embodiment, in which special characters propagate through the shift registers relative to a timing reference count (TRC).
Figure 8:
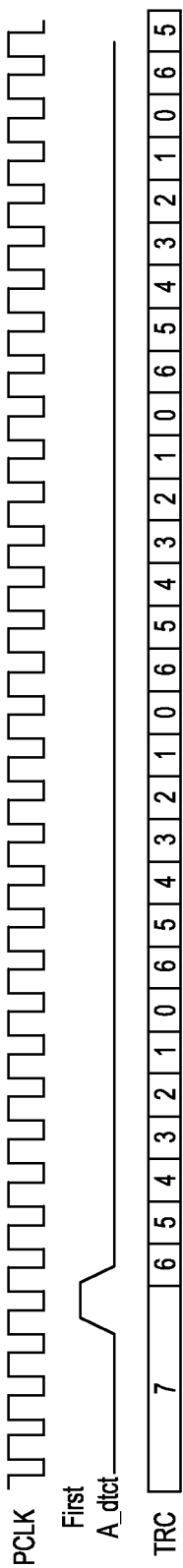
FIG. 8 is a timing diagram illustrating a clock signal, a special character detection signal, and a TRC value in a method of deskewing multiple lanes according to one embodiment.

FIG. 7A shows the status of the shift registers 380a-380d at count or value 7 of the TRC 373 (see FIGS. 4 and 8). At count 7, special characters /A/ (which are octets) enter the first stages 441a, 441b of the first and second shift registers 380a, 380b from the first and second lanes L1 and L2, respectively. The TRC 373 remains to provide count 7 until it receives a detection signal A_dtct from any of the shift registers 380a-380d. For example, as shown in FIG. 8, the TRC 373 can start counting down upon receiving a detection signal A_dtct from any of the first to fourth shift registers 380a-380d. Subsequently, the TRC 373 can count down from 7 to 0, and repeat counting down from 6 to 0, in synchronization with the processing clock PCKL.

When the special characters /A/ are detected at the first stages 441a, 441b of the first and second shift registers 380a, 380b, the shift registers 380a, 380b provide detection signals A_dtct to the registers 382a, 382b (FIG. 4), respectively. The count registers 382a, 382b are clocked by the TRC 373, and store the count 7 of the TRC 373 as the time of detecting the special characters /A/ by the shift registers 380a, 380b.

Figure 7B:
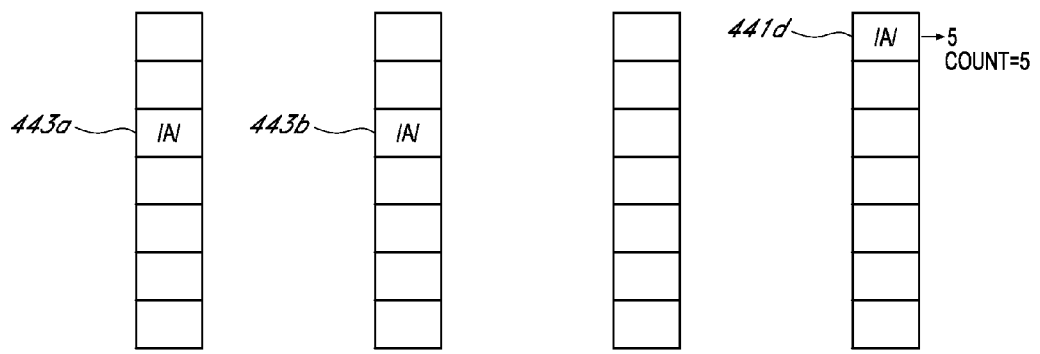

FIG. 7B shows the status of the same shift registers 380a-380d at count 5 of the TRC 373. At count 5, the special characters /A/, which were at the first stages of the first and second shift registers 380a, 380b at count 7, have been shifted to the third stages 443a, 443b of the first and second shift registers 380a, 380b.

In addition, a special character /A/ has entered the first stage 441d of the fourth shift register 380d from the fourth lane L4. When the special character /A/ is detected at the first stage 441d of the fourth shift registers 380d, the fourth shift register 380d provides a detection signal A_dtct to the fourth register 382d (FIG. 4). The fourth count register 382d is clocked by the TRC 373, and stores the count 5 of the TRC 373 as the time of detecting the special character /A/ by the fourth shift register 380d.

Figure 7C:
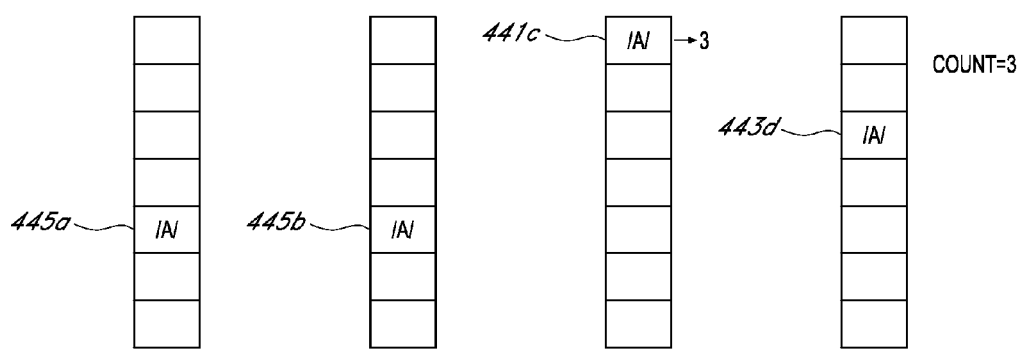

FIG. 7C shows the status of the same shift registers 380a-380d at count 3 of the TRC 373. At count 3, the special characters /A/, which were at the third stages 443a, 443b of the first and second shift registers 380a, 380b and at the first stage 441d of the fourth shift register 380d at count 5, have been shifted to the fifth stages 445a, 445b of the first and second shift registers 380a, 380b, and the third stage 443d of the fourth shift register 380d, respectively.

In addition, a special character /A/ has entered the first stage 441c of the third shift register 380c from the third lane L3. When the special character /A/ is detected at the first stage 441c of the third shift register 380c, the third shift register 380c provides a detection signal k_dtct to the third count register 382c (FIG. 4). The third count register 382c is clocked by the TRC 373, and stores the count 3 of the TRC 373 as the time of detecting the special character by the third shift register 380c.

In the illustrated embodiment, in which the four lanes L1-L4 are deskewed, the special character /A/ detected by the third shift register 380c at count 3 is the last special character detected among the four lanes L1-L4. Thus, the first to fourth count registers 382a-382d have a snap shot of skews among the four lanes L1-L4. In other words, it has been determined that the data stream on the third lane L3 is delayed by 4 counts relative to the data streams on the first and second lanes L1, L2. Further, it has been determined that the data stream on the fourth lane L4 is delayed by 2 counts relative to the data streams on the first and second lanes L1, L2.

At the next count (count 2), all the special characters /A/ have shifted to the next stages: the sixth stage 446a of the first shift register 380a, the sixth stage 446b of the second shift register 380b, the second stage 442c of the third shift register 380c, and the fourth stage 444d of the fourth shift register 380d, respectively.

Further, the first to fourth count registers 382a-382d provide selection signals SEL1-SEL4 to the multiplexers 384a-384d (FIG. 4), based on the snap shot of the skews. For example, the first count register 382a provides the first multiplexer 384a with a first selection signal SEL1 for selecting the sixth stage 446a of the first shift register 380a. The first selection signal SEL1 can indicate a stage of the shift register 380a-380d, which can be expressed in Equation 1 below.

$$SEL_i = COUNT_i - COUNT\_LAST + 2 \qquad \text{Equation 1}$$

In Equation 1, SELi represents a selection signal for an i-th lane. COUNTi is a count stored in the count register 382a-382d of the lane. COUNT_LAST corresponds to the count stored in one of the count register 382a-382d of the particular lane that detected the special character last among the count registers 382a-382d. Thus, the first selection signal SEL1 can indicate selection of the sixth stage 446a of the first shift register 380a, which results from SEL1=7−3+2=6. Similarly, the second to fourth selection signals SEL2-SEL4 can indicate selection of the sixth stage 446b of the second shift register 380b, the second stage 442c of the third shift register 380c, and the fourth stage 444d of the fourth shift register 380d, respectively.

In addition, the first to fourth multiplexers 384a-384d are provided with an enable signal EN, and output data from the selected stages of the shift registers 380a-380d: the sixth stage 446a of the first shift register 380a, the sixth stage 446b of the second shift register 380b, the second stage 442c of the third shift register 380c, and the fourth stage 444d of the fourth shift register 380d. The selection of the stages of the shift registers 380a-380d allow the special characters /A/ to be simultaneously outputted from the lane deskewers 365a-365d (FIG. 4) for the lanes L1-L4, thereby reducing or eliminating skews among the lanes L1-L4. The selection of the stages of the shift registers 380a-380d by the multiplexers 384a-384d is maintained after the initial lane synchronization, and is used for data transmitted and processed thereafter, thereby deskewing the lanes L1-L4 for the data streams.

Figure 9A:
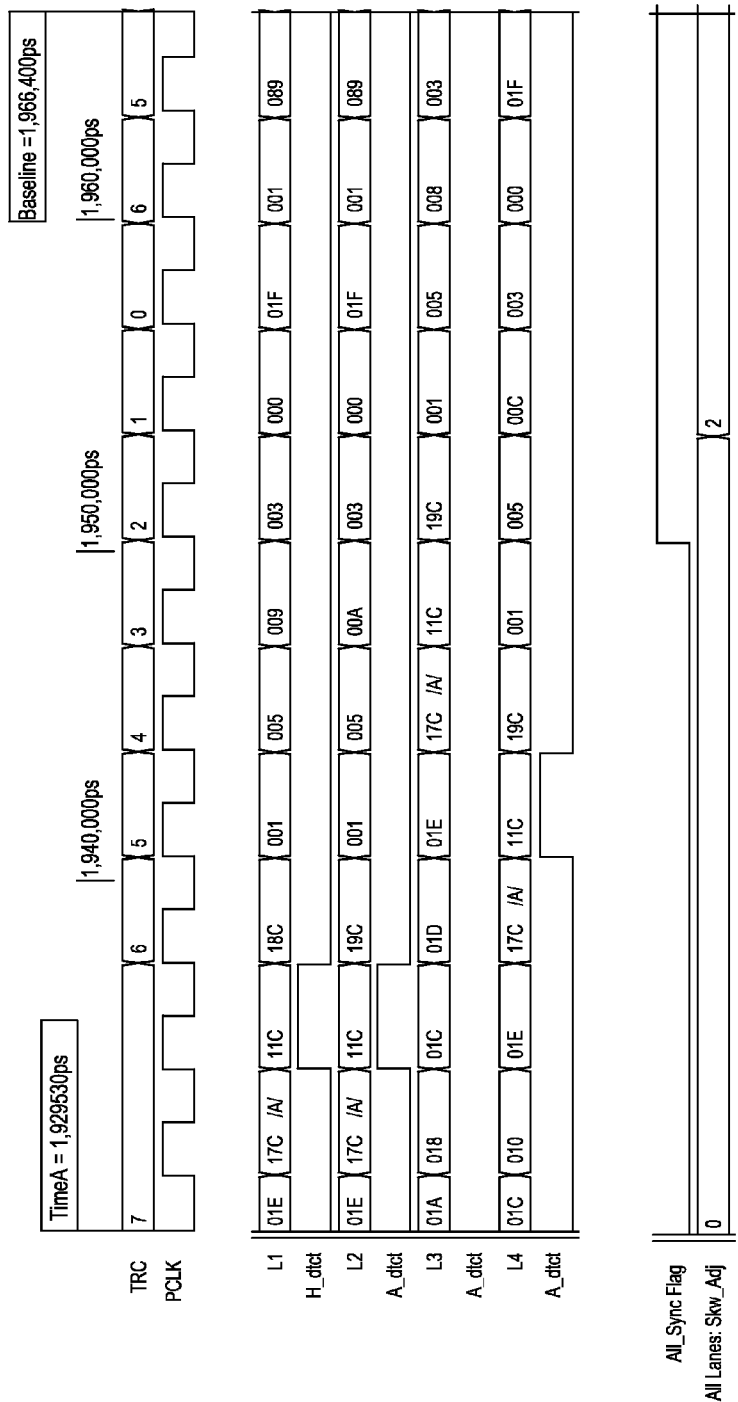
FIG. 9 consists of FIGS. 9A and 9B, and is a timing diagram illustrating a method of deskewing multiple serial lanes according to one embodiment.

FIG. 9 is a timing diagram illustrating the method of FIGS. 7A-7D. At time t0, character /A/ enter the first stages 441a, 441b of the first and second shift registers 380a, 380b (FIG. 7A). At time t1, detection signals A_dtct are generated for the first and second lanes L1, L2. At time t2, the TRC 373 starts counting down, and a character /A/ enters the first stage 441d of the fourth shift register 380d. At time t3, a detection signal A_dtct is generated for the fourth lane L4.

At time t4, a character /A/ enters the first stage 441c of the third shift register 380c. At time t5, a detection signal A_dtct is generated for the third lane L3. At time t6, an All_Sync Flag signal is generated to indicate that all the lanes L1-L4 have detected the characters /A/.

Furthermore, the count registers 382a-382d store count "7" unless they receive a different count. As denoted by reference numeral 910 in FIG. 9, for example, the first and second count registers 382a, 382b maintain "7" as they have detected the characters /A/ at count 7. The third count register 382c maintains "7" until it receives indication of the character /A/ at count 3 at time t5, and then changes the count to "3." The fourth count register 382d maintains "7" until it receives indication of the character /A/ at count 5 at time t3, and then changes the count to "5."

Figure 7D:
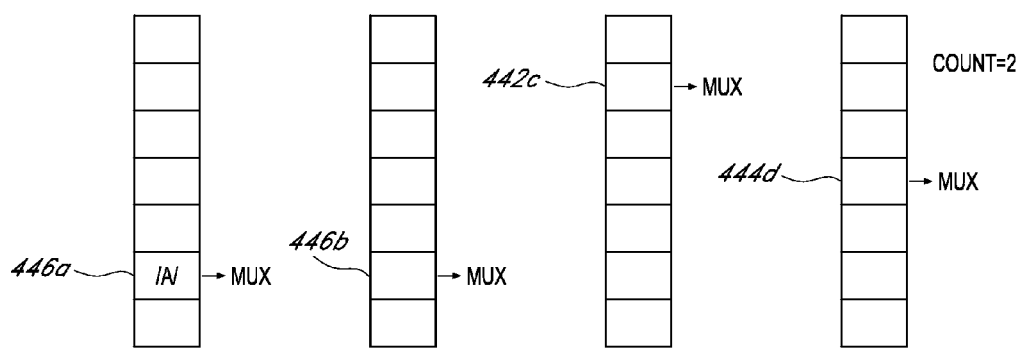

Then, at time t7, all lanes receive a skew adjustment signal or enable signal Skw_Adj, such that the multiplexers 384a-384d (FIG. 4) output data from the selected stages of the shift registers 380a-380d (see FIG. 7D). From time t7, all the lanes are deskewed, and thus the same character position can be driven out from all the lanes simultaneously. For example, at time t7, all the lanes output characters "1E," as denoted by reference numeral "920" in FIG. 9.

During the above operation, each of the /A/ characters propagates through a respective one of the shift registers 380a-380d. For example, the propagation of an /A/ character through the stages of the first shift register 380a is denoted by reference numeral "930" at the bottom of FIG. 9. The first time TRC reaches 0 at time t8, the condition of detection signals A_dtct from all lanes is examined. If any of the count registers 382a-382d has not received a detection signal A_dtct, the deskew process can be repeated.

Deskewing Multiples Links on Multiple Receiver Devices

Figure 10:
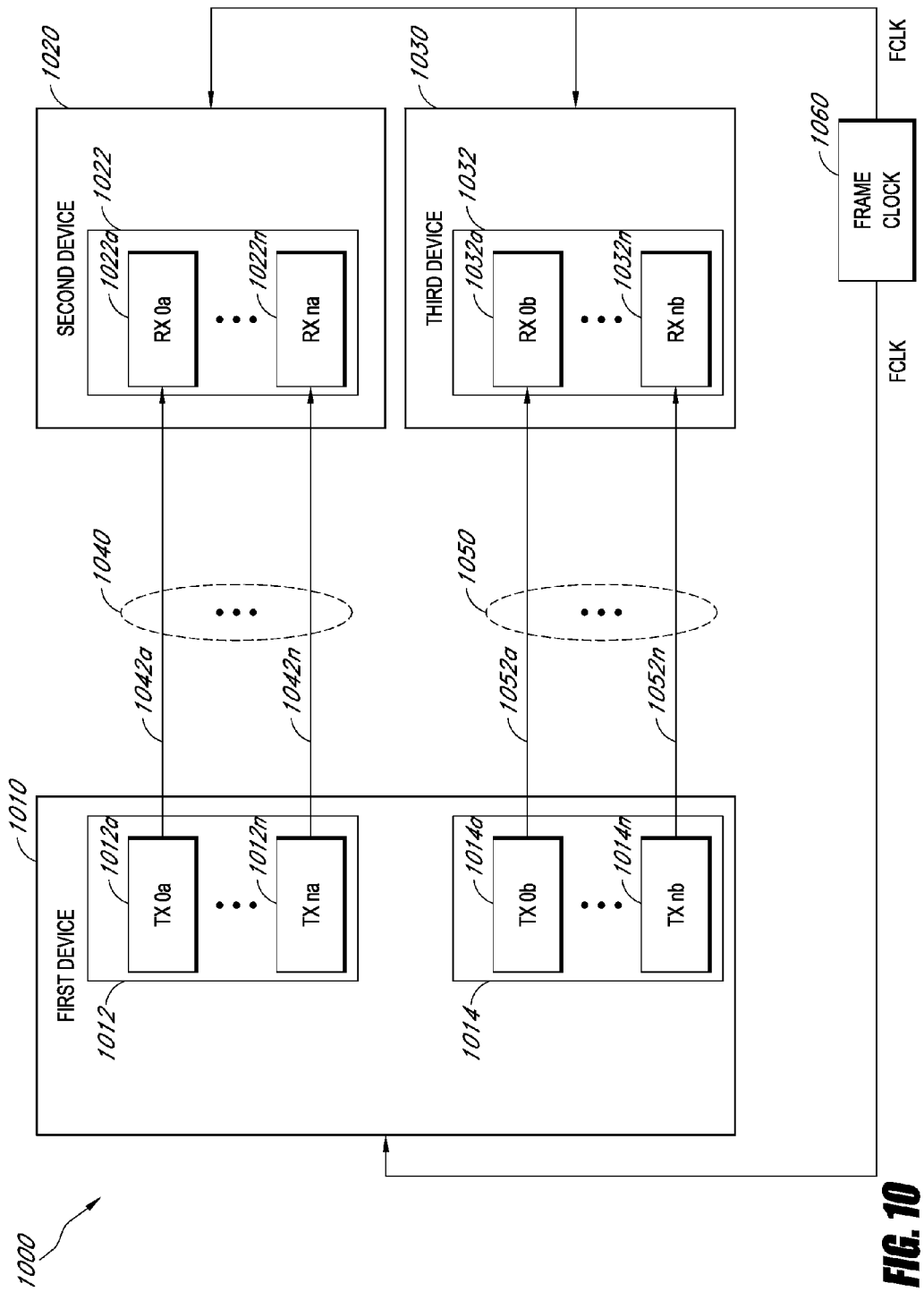
FIG. 10 is a schematic block diagram illustrating another example electronic system including one transmitter device and two receiver devices connected via two serial links.

In other embodiments, the same principles and advantages of the embodiments described above can apply to deskewing multiple links coupled to multiple receiver devices. Referring to FIG. 10, a system for transmitting data via serial links according to another embodiment will be described below. The illustrated system 1000 includes a first device 1010, a second device 1020, a third device 1030, a first serial link 1040, a second serial link 1050, and a frame clock generator 1060. The first serial link 1040 can include a plurality of first serial lanes 1042a-1042n, The second serial link 1050 can include a plurality of second serial lanes 1052a-1052n.

In one embodiment, the first device 1010 can be an analog-to-digital converter (ADC) device, and the second and third devices 1020, 1030 can be logic devices, such as a field-programmable gate array (FPGA) or an application-specific integrated circuit (ASIC). In another embodiment, the first device 1010 can be a logic device, and each of the second and third devices 1020, 1030 can be a digital-to-analog converter (DAC) device. A skilled artisan will, however, appreciate that the first to third devices 1010-1030 can be any type of devices that transmit and/or receive serial data. While the illustrated embodiment is described in the context of a unidirectional data transmission, the principles and advantages of the embodiment can apply to bi-directional data transmission/reception.

In the illustrated embodiment, the first device 1010 can include first and second transmitter blocks 1012, 1014, each of which includes a plurality of transmitters 1012a-1012n, 1014a-1014n. The first and second transmitter blocks 1012, 1014 receive data, for example, parallel data, from one or more components (for example, an application logic module or ADCs) of the first device 1010.

The first transmitter block 1012 converts data into multiple serial data streams, and transmits the data streams, using the plurality of first transmitters 1012a-1012n, through the first serial lanes 1042a-1042n to the second device 1020. Each of the first serial lanes 1042a-1042n can include either a single line for single-ended signaling, or a pair of lines for differential signaling.

The second transmitter block 1014 converts data into multiple serial data streams, and transmits the data streams, using the plurality of second transmitters 1014a-1014n, through the second serial lanes 1052a-1052n to the third device 1030. Each of the second serial lanes 1052a-1052n can include either a single line for single-ended signaling, or a pair of lines for differential signaling.

The second device 1020 can include a receiver block 1022, which includes a plurality of first receivers 1022a-1022n. The first receivers 1022a-1022n receive the serial data streams from the first transmitters 1012a-1012n via the first serial lanes 1042a-1042n, and convert the serial data streams into parallel data. In certain embodiments, the receiver block 1022 can include a single receiver.

The third device 1030 can include a receiver block 1032, which includes a plurality of second receivers 1032a-1032n. The second receivers 1032a-1032n receive the serial data streams from the second transmitters 1014a-1014n via the second serial lanes 1052a-1052n, and convert the serial data streams into parallel data. In certain embodiments, the receiver block 1032 can include a single receiver. The receiver blocks 1022, 1032 provide the data to one or more components (for example, application logic or DACs) of the second and third devices 1020, 1030, respectively.

The frame clock generator 1060 serves to generate a frame clock signal FCLK, and sends it to the first to third devices 1010-1030. In one embodiment, the frame clock signal FCLK can have a frequency of about 10 MHz to about 600 MHz, for example, 312.5 MHz.

The period of the frame clock signal FCLK can be defined as the duration of one frame of data units (for example, octets). The frame clock signal FCLK is used by the first to third devices 1010-1030 to generate a processing clock PCLK as described above in connection with FIG. 3 for synchronization of data transmission. Alternatively, a data clock recovered from a data signal can be used to generate the processing clock PCLK. The processing clock PCLK can be used to generate a TRC count or value in each of the receiver devices 1020, 1030. The TRC values on the different receiver devices 1020, 1030 are within 1 clock period of each other because all the TRC's in the devices 1020, 1030 start counting after a Power-On Reset signal (FIG. 13) is asserted.

Figure 11:
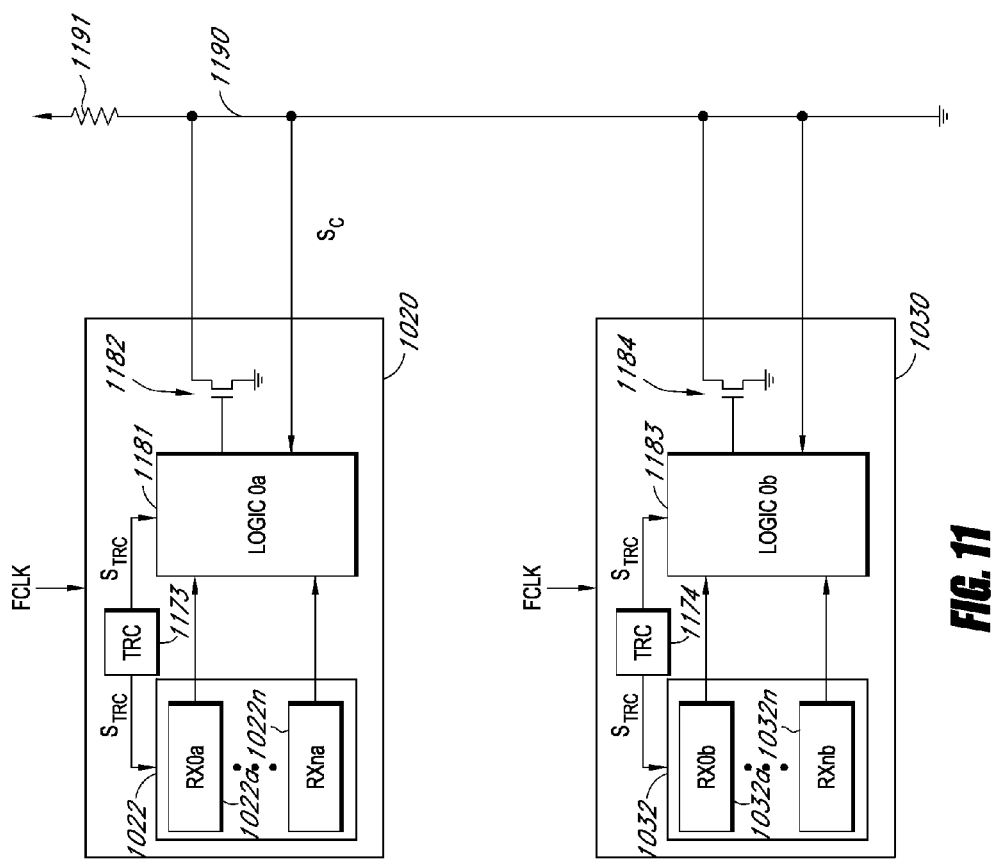
FIG. 11 is a schematic block diagram illustrating multiple receiver devices with broadcasting capability for deskewing serial links according to one embodiment.

Referring to FIGS. 11-14D, a system for deskewing multiple serial links coupled to multiple receiver devices will be described below. FIG. 11 illustrates the second device 1020 and the third device 1030 of FIG. 10. As described above in connection with FIG. 10, each of the second and third devices 1020, 1030 includes a receiver block 1022, 1032. The second device 1020 also includes a first TRC 1173, a first logic module 1181, and a first switch 1182. The third device 1030 also includes a second TRC 1174, a second logic module 1183, and a second switch 1184. Details of the TRCs 1173, 1174 and the receiver blocks 1022, 1032 can be as described above in connection with FIGS. 3 and 4. The logic modules 1181, 1183 of the devices 1020, 1030 are electrically coupled to a control line 1190 to receive a control signal Sc from other devices. The control line 1190 can be an open-collector bidirectional bus.

In the illustrated embodiment, the first logic module 1181 of the second device 1020 can receive a TRC value signal $S_{TRC}$ from the first TRC 1173. The first logic module 1181 can switch on or off the first switch 1182, such that a voltage at the control line 1190 is changed to a selected voltage level, for example, ground. The first logic module 1181 can also receive a control signal Sc from, for example, the third device 1030 via the control line 1190. The first switch 1182 can include, for example, a MOSFET.

Similarly, the second logic module 1183 of the third device 1030 can receive a TRC value signal $S_{TRC}$ from the second TRC 1174. The second logic module 1183 can switch on or off the second switch 1184, such that a voltage at the control line 1190 is changed to a selected voltage level, for example, ground. The second logic module 1183 can receive a control signal Sc from, for example, the second device 1020 via the control line 1190. The second switch 1184 can include, for example, a MOSFET.

Figure 12:
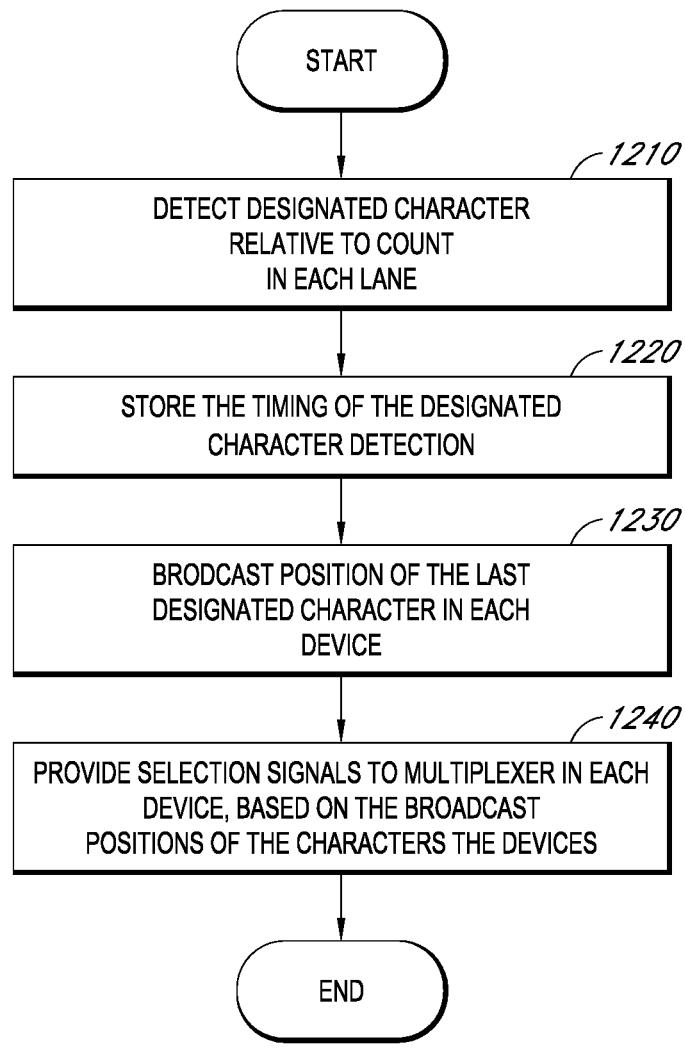
FIG. 12 is a flowchart illustrating a process of deskewing serial data transmitted to multiple devices over multiple links.

Referring to FIG. 12, a method of deskewing multiple links coupled to multiple receiver devices will be described below. At a block 1210, selected characters (such as character /A/ under the JESD 204A standard) are detected relative to a TRC value in each of the devices 1020, 1030. At a block 1220, the TRC values at which the selected characters were detected in the devices 1020, 1030 are stored.

As described above in connection with FIG. 10, the same frame clock signal FCLK is used to generate processor clocks PCLK in the devices. As the TRC values in the devices 1020, 1030 are generated, based on the processing clock PCLK (see FIG. 3), the TRC values in the devices 1020, 1030 can be substantially synchronized with each other to provide a reference clock for the detection of selected characters in the different devices 1020, 1030.

At a block 1230, the time or position of the last selected character in each of the receiver devices 1020, 1030 is broadcast by the logic module of the receiver device to all the other receiver devices. For example, the logic module 1181 of the second device 1020 can broadcast information on the last selected character received by the second device 1020 to all the other devices in the system (for example, the third device 1030) in the illustrated embodiment of FIGS. 10 and 11. At block 1240, the multiplexers in each of the devices 1020, 1030 are controlled to select stages of their respective shift registers, based on the broadcast positions of the characters of the devices 1020, 1030.

Figure 13A:
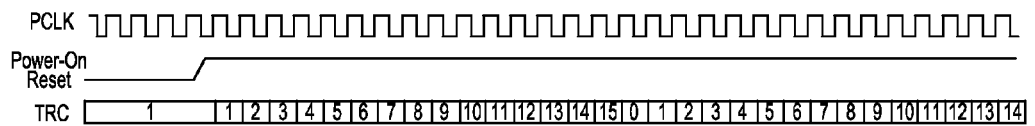
FIGS. 13A and 13B are timing diagrams illustrating a method of deskewing multiple serial links according to one embodiment.
Figure 13B:
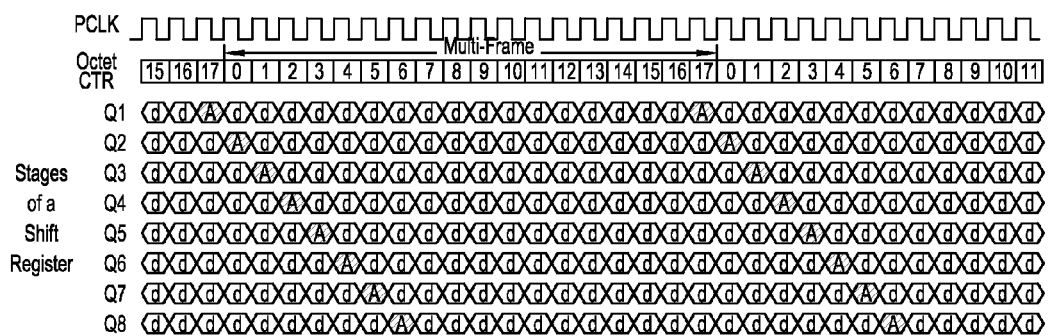

Referring to FIGS. 13A and 13B, a method of deskewing multiple links coupled to multiple receiver devices according to another embodiment will be described below. FIGS. 13A-13D are timing diagrams illustrating various signals used in the method.

FIG. 13A shows a processing clock PCLK which can be generated from a frame clock signal FCLK, using a PLL and a frequency divider in each device (see FIG. 3). When power is reset on the system (for example, the system 1000 of FIG. 10), a Power-On Reset signal, which is clocked with PCLK, is triggered. The TRC's of the receiver devices (for example, the second and third devices 1020, 1030 of FIG. 10) start counting up from 0 to a selected number greater than 2*SK, in which SK is the maximum allowable skew among the lanes. For example, the selected number can be 15 in the illustrated embodiment. After the selected number is reached, the TRC's repeat counting up from 0 to the selected number.

Each of the receivers 1022a-1022n, 1032a-1032n in the receiver blocks 1022, 1032 of the devices 1020, 1030 can have a shift register, as described above in connection with FIG. 4. In the illustrated embodiment, a stream of multi-frames passes through each of the shift registers in the receivers in the receiver blocks 1022, 1032. For example, the stream can include at least a portion of an initial lane alignment sequence (ILS) under the JESD 204A. Such a portion of the ILS can be referred to as "multi chip sync (MCS)" in the context of this document.

In the illustrated embodiment, a multi-frame can include 16 characters, one of which can be a special or selected character, such as /A/ character under the JESD 204A standard. The special characters are shifted through the stages of the shift registers in synchronization with the processor clock PCLK. For example, /A/ characters received at a shift register can propagate as time goes on, as shown in FIG. 13B.

Referring to FIGS. 10, 11 and 14A-14D, the operation of the devices described above in connection with FIGS. 10 and 11 will be described in greater detail. In the illustrated embodiment, the second device 1020 (FIGS. 10 and 11) has a first receiver and a second receiver coupled to a first lane L1a and a second lane L2a, respectively. The third device 1030 (FIGS. 10 and 11) has a third receiver and a fourth receiver coupled to a third lane L3b and a fourth lane L4b, respectively. Although each of the devices 1020, 1030 is described as having two receivers for the sake of simplicity, the devices can have more receivers in other embodiments. Each of the receivers of the devices 1020, 1030 includes a lane deskewer which includes a shift register 1480a-1480d, similar to those described above in connection with FIG. 3. Each of the shift registers 1480a-1480d can include first to seventh stages Q1-Q7. In other embodiments, the number of stages can vary widely, depending on the range of skews that the devices are designed to reduce or eliminate.

Figure 14A:
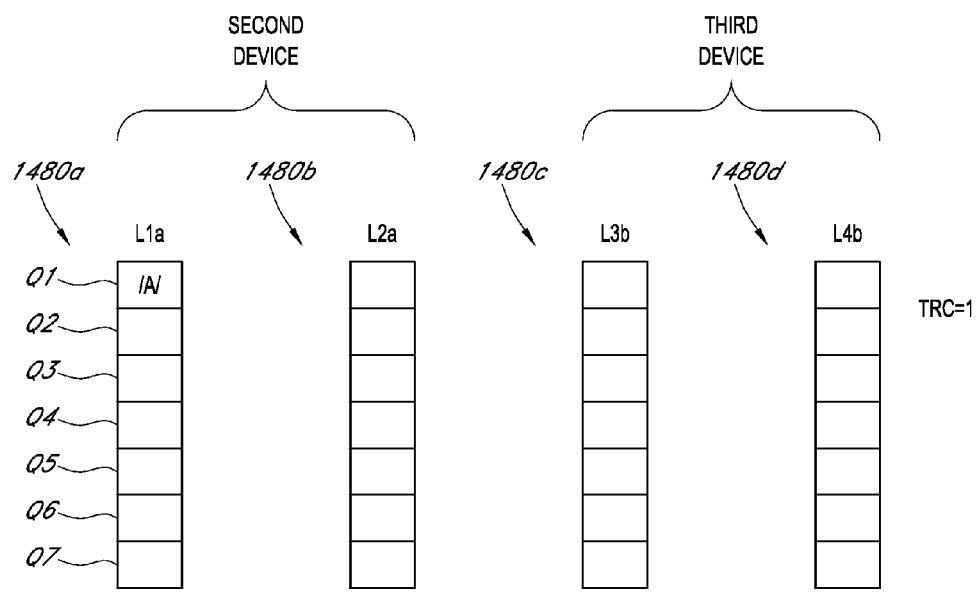
FIGS. 14A-14D are schematic block diagrams of two devices, each of which includes two shift registers in lane deskewers according to one embodiment, in which selected characters propagate through the shift registers relative to TRC count.

FIG. 14A shows the status of the shift registers 1480a-1480d of the second and third devices 1020, 1030. The first shift register 1480a has received a special character /A/ at its first stage Q1 when the TRC value is 1 (TRC=1) (see FIG. 13A) during initial lane alignment (for example, the initial alignment period described in connection with FIG. 6). In the illustrated embodiment, a deskewing process is performed during initial lane alignment before regular data transmission. However, a skilled artisan will appreciate that a deskewing process can be performed after initial alignment, for example, during regular data transmission.

Figure 14B:
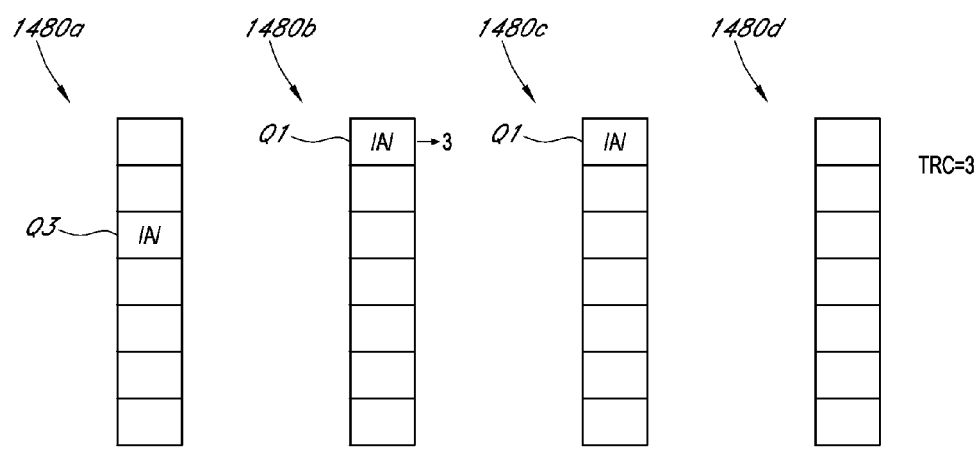

As shown in FIG. 14B, at TRC=3, the second shift register 1480b of the second device 1020 has received a special character /A/ at its first stage Q1. As the second device 1020 has only two lanes, the character /A/ which has entered the first stage Q1 of the second shift register 1480b is the last one, and the logic module 1181 (FIG. 11) of the second device 1020 stores the TRC value (TRC=3) of the last character. At TRC=3, the third shift register 1480c of the third device 1030 has received a special character /A/ at its first stage Q1. The special character in the first shift register 1480a of the second device 1020 has been shifted to the third stage Q3 of the first shift register 1480a.

Figure 14C:
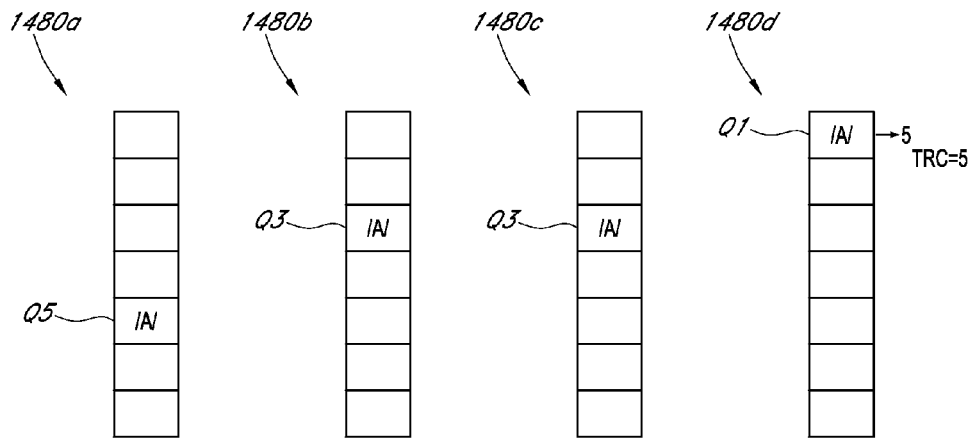

At TRC=5, the fourth shift register 1480d of the third device 1030 has received a special character /A/ at its first stage Q1, as shown in FIG. 14C. As the third device 1030 has only two lanes, the character /A/ which has entered the first stage Q1 of the fourth shift register 1480d is the last one, and the logic module 1183 (FIG. 11) of the third device 1030 stores the TRC value (TRC=5) of the last character. At TRC=5, the special character in the first shift register 1480a has been shifted to the fifth stage Q5 of the first shift register 1480a. The special character in the second shift registers 1480b has been shifted to the third stage Q3 of the second shift register 1480b. The special character in the third shift registers 1480c has been shifted to the third stage Q3 of the third shift register 1480c. The TRC values of the last special characters received by the two devices 1020, 1030 are used to provide a snap shot of skews between the serial links coupled to the devices 1020, 1030.

After the devices 1020, 1030 determine the TRC value of the last special character received by the devices, the devices 1020, 1030 share the information with one another by broadcasting the information using the logic modules and 1181, 1183, and the control line 1190 (FIG. 10).

Figure 15A:
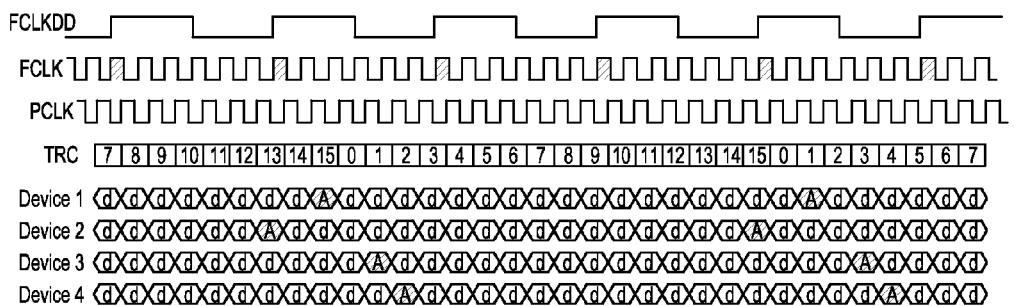
FIGS. 15A and 15B are timing diagrams illustrating a method of broadcasting deskewing information to multiple receiver devices according to one embodiment.
Figure 15B:
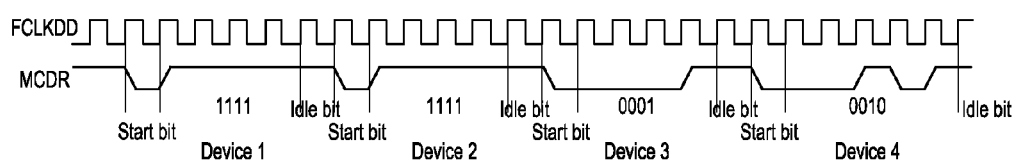

Referring to FIGS. 15A and 15B, a method of broadcasting information on skews according to one embodiment will be described below. FIG. 15A shows an FCLKDD signal which has a frequency that is, for example, ⅙ of the frequency of the frame clock signal FCLK, and is provided to multiple devices, for example, first to fourth receiver devices. For example, the FCLKDD signal can have a frequency of about 1 MHz to about 100 MHz.

In the illustrated embodiment, each of the first to fourth devices has a plurality of deskewers in its receivers to deskew the lanes within the single device. It is assumed that each of the first to fourth devices has a snap shot of skews among the lanes within the device.

In addition, each of the devices determines the TRC value at which the last special character (/A/) received by its receivers had been detected. For example, the first device determines that the last character has been detected at TRC value 15 which appears first from the left in FIG. 15A. The second device determines that the last character has been detected at TRC value 13 which appears first from the left in FIG. 15A. The third device determines that the last character has been detected at count 1 immediately after the TRC value 15. The fourth device determines that the last character has been detected at count 2 immediately after the TRC value 15. Such a TRC value of a device can be referred to as a device's last /A/ position or "APOS."

Each device broadcasts its APOS starting with the first device, and then the second device, and so on. A device with an APOS value earlier than the last APOS value broadcast shall simply repeat that value.

As shown in FIG. 15B, the logic modules of the devices (for example, 1181, 1183 of FIG. 11) sequentially broadcast information bits on the TRC values of the last characters (or APOS's) in synchronization with the FCLKDD signal with an idle bit between the information bits. FIG. 15B illustrates one embodiment of such a broadcast signal. In the illustrated embodiment, a Multi-Chip Delay Reference (MCDR) signal is provided to all the receiver devices via the control line (for example, the control line 1190 of FIG. 11) using a switch coupled between the logic module and the switch of the device (for example, the logic module 1181 and the first switch 1182 of FIG. 11). When the switch is off, the control line 1190 has an idle "1" state. When the switch is on, the control line 1190 has an active "0" state. In this manner, the switch can be used to send data bits indicative of the position of the last character.

A protocol on the MCDR signal according to one embodiment can be as follows. The default state of the MCDR signal is idle logic 1 (Stop bit). In the illustrated embodiment, the information is carried by four bits, which can indicate one of APOS values of 0 to 15. For example, the device 1 sends "1111" to indicate that the APOS value is 15.

The first device broadcasts by driving 0 for one FCLKDD bit time: the start bit. The first device then follows by driving 4 bit times with the APOS value with the most significant bit (MSB) first. The next bit time is an idle bit. Then, the sequence repeats for the next device. FIG. 15B shows the MCDR sequence for the first to fourth devices. The first device drives its APOS value of 15 on MCDR. Next, the second device echoes the previous value since its own value is the same as that of the first device. A sequence of 2 or more idle bits indicates to the devices that the process is completed.

In some instances, the devices can sequentially perform determination of the counts of the last characters. The first device can complete the determination first, and broadcast the information on the determination. While the first device broadcasts the information, all the other devices can continue determination of the counts of the last characters. This is possible because the broadcast by the first device is performed during several clock cycles of the FCLKDD signal (which has a frequency that is, for example, 1⁄16 of the frequency of the frame clock signal FCLK), during which the other devices can perform the determination at a higher frequency, for example, using the frame clock signal FCLK. In other embodiments, the information can be broadcast while being clocked with the FCLK signal.

Once all the information from the devices have been broadcast, all the devices can have a snap shot of skews among the devices (or the serial links). In one embodiment, each of deskewers in receivers of the first to fourth devices can compute a difference $APOS_A$ between the received APOS value ($APOS_R$) and its own APOS ($APOS_L$): $APOS_A = APOS_L - APOS_R$. By definition, the maximum value of $APOS_A$ is 7 in the illustrated embodiment. Therefore, the devices can properly interpret $APOS_A$ values greater than 7. If $|APOS_A|>7$, then 10000 should be added to the smaller value. The value of $APOS_A$ can be interpreted as follows.

If $APOS_A<0$, the device can retard its shift register octet output by $|APOS_A|$ PCLK's, and at its turn, can echo the latest received $APOS_R$ that is smaller than its $APOS_L$. If $APOS_A \geq 0$, no action to the shift register octet output is taken, the device schedules to drive its $APOS_L$ at its time slot on the MCDR signal. At the conclusion of this process, each deskewer can move its shift register octet output to match the most skewed lane, or take no action if its $APOS_L$ is the highest value. In the example above, the devices can take the following actions.

After device 1 APOS is broadcast,
$APOS_A$ (Device 2)=1101−1111=111110 (or −2): shift the shift register output by 2
$APOS_A$ (Device 3)=10001−1111=000010 (or 2): no action
$APOS_A$ (Device 4)=10010−1111=000011 (or 3): no action
After device 2 APOS is broadcast,
$APOS_A$ (Device 1)=1111−1111=000000 (or 0): no action
$APOS_A$ (Device 3)=10001−1111=000010 (or 2): no action
$APOS_A$ (Device 4)=10010−1111=000011 (or 3): no action
After device 3 APOS is broadcast,
$APOS_A$ (Device 1)=01111−10001=111110 (or −2): shift the shift register output by 2
$APOS_A$ (Device 2)=01111−10001=111110 (or −2): shift the shift register output by 2
$APOS_A$ (Device 4)=10010−10001=000001 (or 1): no action
After device 4 APOS is broadcast,
$APOS_A$ (Device 1)=10001−10010=111111 (or −1): shift the shift register output by 1
$APOS_A$ (Device 2)=10001−10010=111111 (or −1): shift the shift register output by 1
$APOS_A$ (Device 3)=10001−10010=111111 (or −1): shift the shift register output by 1

Cumulatively, the first device is shifted by 3 PCLKs. The second device is shifted by 5 PCLKs. The third device is shifted by 1 PCLK, and the fourth device is shifted by 0 PCLK. In another embodiment, the shifts can be implemented in the devices at the end of all broadcasts as a one time operation.

Figure 14D:
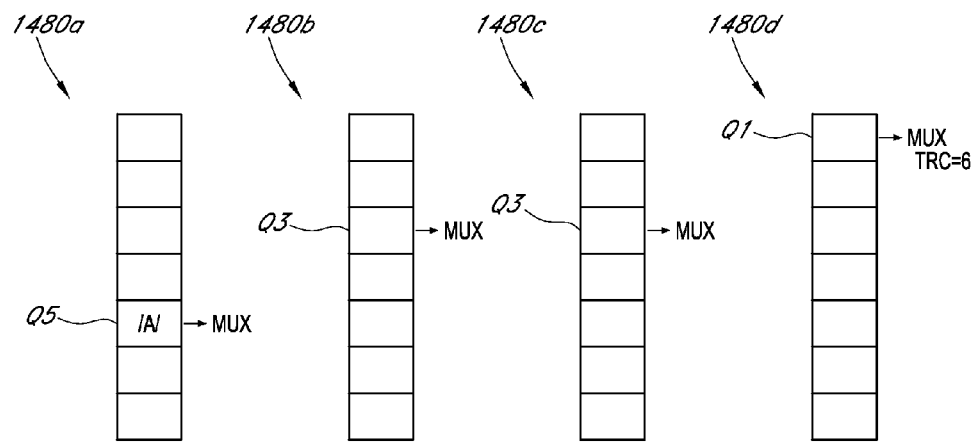

Then, similar to the step described above in connection with FIG. 7D, a stage in each of the shift registers 1480a-1480d of the devices 1020, 1030 is selected for outputting data, as shown in FIG. 14D. In FIG. 14D, multiplexers (not shown) in the deskewers of the devices 1020, 1030 can select the fifth stage Q5 of the first shift register 1480a, the third stage Q3 of the second shift register 1480b, the third stage Q3 of the third shift register 1480c, and the first stage Q1 of the fourth shift register 1480d.

The selection of the stages of the shift registers 1480a-1480d allows the special characters /A/ to be simultaneously outputted from the shift registers 1480a-1480d for the lanes L1a, L2a, L3b, L4b, thereby reducing or eliminating skews among the serial link and lanes. The selection of the stages of the shift registers 1480a-1480d by the multiplexers is maintained after the initial lane synchronization, and is used for data transmitted and processed thereafter, thereby deskewing the serial data streams. PCLK and TRC will not be perfectly aligned across all devices. The synchronization scheme described can be limited to approximately ±1 PCLK cycle resolution based on the alignment of the synchronization of the external reset across all devices and the phase of PCLK in all devices.

Applications

In the embodiments described above, serial data transmission systems employing the above described configurations can be implemented into various electronic devices or integrated circuits. Examples of the electronic devices can include, but are not limited to, consumer electronic products, parts of the consumer electronic products, electronic test equipments, etc. Examples of the electronic devices can also include memory chips, memory modules, circuits of optical networks or other communication networks, and disk drive circuits. The consumer electronic products can include, but are not limited to, a mobile phone, cellular base stations, a telephone, a television, a computer monitor, a computer, a hand-held computer, a personal digital assistant (PDA), a stereo system, a cassette recorder or player, a DVD player, a CD player, a VCR, an MP3 player, a radio, a camcorder, a camera, a digital camera, a portable memory chip, a copier, a facsimile machine, a scanner, a multi functional peripheral device, a wrist watch, a clock, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus comprising:
a plurality of receivers, each of the receivers being configured to receive a serial data stream, each of the receivers comprising:
a shift register comprising a plurality of stages configured to
propagate a stream of characters in sequence, each of the stages
being configured to store a character,
shift the character to a next stage of the shift register in response to
a clock signal,
a special character in the stream of characters, the special character comprising a character provided for timing alignment, and
generate a signal indicative of detection of the special character;
a count register configured to receive the signal generated by the shift mister, and to store a count upon receiving the signal generated by the shift register; and
a multiplexer having a plurality of inputs, each of the inputs being electrically coupled to a respective one of the stages of the shift register, and configured to select one of the stages based on the count to generate an output for the multiplexer; and
a multiplexer control circuit configured to control selection by the multiplexers such that the outputs of the multiplexers of the receivers are deskewed,
wherein the count registers in the receivers are configured to store the counts with reference to a common timing reference count.

2. The apparatus of claim 1, wherein the special character comprises multiple bits.

3. The apparatus of claim 1, wherein each of the receivers is configured to receive an initial alignment sequence in compliance with JESD 204A standard, and wherein the special character comprises /A/ character in the initial alignment sequence under JESD 204A standard.

4. The apparatus of claim 1, wherein the shift register includes a first stage configured to receive the stream of characters, and wherein the first stage is configured to detect the special character.

5. The apparatus of claim 1, further comprising a timing reference counter (TRC) configured to generate the common timing reference count at least partly in response to a frame clock signal received by the apparatus.

6. The apparatus of claim 5, wherein the timing reference counter is configured to start increasing or decreasing the common timing reference count upon determining that any of the shift registers in the receivers has first detected the special character.

7. The apparatus of claim 1, wherein the count register is configured to provide a selection signal to the multiplexer, based at least partly on the stored count, such that the multiplexer selects the one of the stages.

8. The apparatus of claim 7, wherein the count register is configured to generate the selection signal after the shift registers in the receivers have detected the special characters.

9. The apparatus of claim 8, wherein the stage selected by the multiplexer in one of the receivers is represented by COUNTi−COUNT_LAST+2,
wherein COUNTi corresponds to a count stored in the count register of the one receiver, and
wherein COUNT_LAST corresponds to a count stored in the count register of any of the receivers that has last detected the special character.

10. The apparatus of claim 1, wherein the plurality of receivers are configured to receive the serial data streams from a single transmitter device.

11. The apparatus of claim 1, wherein the plurality of receivers include a first group of receivers configured to receive serial data streams from a first transmitter device, and a second group of receivers configured to receive serial data streams from a second transmitter device separated from the first transmitter device.

12. The apparatus of claim 1, wherein each of the receivers further comprises one or more of a physical layer (PHY) clock and data recovery (CDR) module, a deserializer, a byte boundary detector, or a decoder on a signal path upstream of the shift register of the receiver.

13. A method of deskewing multiple serial data streams received over multiple lanes, the method comprising:
generating a plurality of character streams from the multiple serial data streams;
propagating the plurality of character streams through a plurality of shift registers, each of the shift registers including a plurality of stages arranged in sequence to propagate a respective one of the character streams, each of the stages being configured to store a character, and shift the character to a next stage in response to a clock signal; and
detecting a special character in one of the character streams by a respective one of the shift registers, the special character comprising a character provided for timing alignment generating a signal indicative of detection of the special character by the respective one of the shift registers;
receiving, by a plurality of count registers, the signals generated by the shift registers;
storing, by each of the count registers, a count with reference to a common timing reference count upon receiving the signal generated by a respective one of the shift registers; and
selecting, by a control circuit, one of the stages of each of the shift registers for an output based on the count stored in a respective one of the count registers such that the selected outputs from the shift registers are deskewed.

14. The method of claim 13, wherein the special character comprises multiple bits.

15. The method of claim 13, wherein detecting the special character comprises detecting the special character by a first stage of each of the shift registers.

16. The method of claim 13, further comprising:
receiving a frame clock signal; and
generating the common timing reference count at least partly in response to the frame clock signal.

17. The method of claim 13, wherein selecting the one of the stages comprises selecting the one of the stages after the special characters are detected by all the shift registers.

18. The method of claim 17, wherein the selected stage of one of the shift registers is represented by COUNTi−COUNT_LAST+2,
wherein COUNTi corresponds to a count stored in the count register associated with the shift register, and
wherein COUNT_LAST corresponds to a count stored in the count register of any of the shift registers that has last detected the special character.

19. The method of claim 13, further comprising receiving the multiple serial data streams from a single transmitter device.

20. The method of claim 13, further comprising receiving the multiple serial data streams from a plurality of transmitter devices.

* * * * *

UNITED STATES PATENT AND TRADEMARK OFFICE
CERTIFICATE OF CORRECTION

PATENT NO. : 8,520,787 B2
APPLICATION NO. : 13/044432
DATED : August 27, 2013
INVENTOR(S) : Hennedy It is certified that error appears in the above-identified patent and that said Letters Patent is hereby corrected as shown below:

In the Specification

In column 11 at line 16, Change "k_dtct" to --A_dtct--.

In column 12 at line 10, Change "to," to --t0,--.

In column 17 at line 25, Change "116" to --1/6--.

In the Claims

In column 19 at line 13, In Claim 1, change "a" to --detect a--.

In column 19 at line 19, In Claim 1, change "mister," to --register,--.

In column 20 at line 24, In Claim 13, after "signal;" delete "and".

In column 20 at line 28, In Claim 13, change "alignment" to --alignment;--.

Signed and Sealed this
Twenty-fifth Day of March, 2014

Michelle K. Lee
*Deputy Director of the United States Patent and Trademark Office*